United States Patent
Liang et al.

(10) Patent No.: US 11,917,159 B2
(45) Date of Patent: Feb. 27, 2024

(54) PREDICTION METHOD, ENCODER, DECODER AND COMPUTER STORAGE MEDIUM

(71) Applicant: GUANGDONG OPPO MOBILE TELECOMMUNICATIONS CORP., LTD., Guandong (CN)

(72) Inventors: Fan Liang, Dongguan (CN); Siqi Cao, Dongguan (CN); Jian Cao, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 245 days.

(21) Appl. No.: 17/468,552

(22) Filed: Sep. 7, 2021

(65) Prior Publication Data

US 2022/0014754 A1    Jan. 13, 2022

Related U.S. Application Data

(63) Continuation of application No. PCT/CN2019/077536, filed on Mar. 8, 2019.

(51) Int. Cl.
*H04N 19/137* (2014.01)
*H04N 19/105* (2014.01)
(Continued)

(52) U.S. Cl.
CPC ......... *H04N 19/137* (2014.11); *H04N 19/105* (2014.11); *H04N 19/132* (2014.11); *H04N 19/176* (2014.11); *H04N 19/46* (2014.11)

(58) Field of Classification Search
CPC .. H04N 19/137; H04N 19/105; H04N 19/132; H04N 19/176; H04N 19/46;
(Continued)

(56) References Cited

U.S. PATENT DOCUMENTS

2018/0205965 A1* 7/2018 Chen ................... H04N 19/105
2018/0316929 A1  11/2018 Li et al.
(Continued)

FOREIGN PATENT DOCUMENTS

| CN | 106559669 A  | 4/2017 |
| CN | 108271023 A  | 7/2018 |
| WO | 2018047668 A1 | 3/2018 |

OTHER PUBLICATIONS

H-Y Han et al: "Affine motion mode in intra coding", 13. JVET Meeting; Jan. 9, 2019-Jan. 18, 2019; Marrakech; (The Joint Video Explorationteam of ISO/IEC JTC1/SC29/WG11 and ITU-TSG.16 ), No. JVET-M0634 Jan. 14, 2019 (Jan. 14, 2019), XP030202148, paragraph [0001]. 3 pages.
(Continued)

*Primary Examiner* — Boubacar Abdou Tchoussou
(74) *Attorney, Agent, or Firm* — PERKINS COIE LLP

(57) ABSTRACT

A prediction method, including: creating a candidate list corresponding to a coding mode for the coding mode used by a coding block in an original picture, wherein the coding mode includes a first affine motion mode or a second affine motion mode, a reference block in the candidate list is spatially adjacent to the coding block, and the reference block is coded using the first affine motion mode or the second affine motion mode; performing affine motion estimation on the coding block according to the candidate list corresponding to the coding mode to obtain coding parameters corresponding to the coding block; and performing predictive coding on the coding block on the basis of the coding parameters corresponding to the coding block.

12 Claims, 12 Drawing Sheets

(51) Int. Cl.
*H04N 19/132* (2014.01)
*H04N 19/176* (2014.01)
*H04N 19/46* (2014.01)

(58) Field of Classification Search
CPC .... H04N 19/159; H04N 19/54; H04N 19/593; H04N 19/52
See application file for complete search history.

(56) References Cited

U.S. PATENT DOCUMENTS

| | | | | |
|---|---|---|---|---|
| 2018/0376161 | A1* | 12/2018 | Chen | H04N 19/105 |
| 2019/0028731 | A1* | 1/2019 | Chuang | H04N 19/159 |
| 2019/0215534 | A1 | 7/2019 | Kondo | |
| 2019/0335191 | A1* | 10/2019 | Kondo | H04N 19/85 |
| 2021/0329282 | A1* | 10/2021 | Lee | H04N 19/109 |

OTHER PUBLICATIONS

H-Y Han et al: "Affine motion mode in intra coding", 13. JVET Meeting; Jan. 9, 2019-Jan. 18, 2019; Marrakech; (The Joint Video Explorationteam of ISO/IEC JTC1/SC29/WG11 and ITU-TSG.16 ), No. JVET-M0634 Jan. 14, 2019 (Jan. 14, 2019), XP030202149, the whole document. 7 pages.

Sixin Lin (Huawei) et al: "Affine transform prediction for next generation video coding", 113. MPEG Meeting; Oct. 19, 2015-Oct. 23, 2015; Geneva; (Motion Picture Expert Group ORISO/IEC JTC1/SC29/WG11), No. m37525 Oct. 26, 2015 (Oct. 26, 2015), XP030065892, figures 1-5, paragraphs [02.1]-[02.2], paragraphs [2.3.1]-[2.3.2]. 10 pages.

Xu Jizheng et al: "Overview of the Emerging HEVC Screen Content Coding Extension", IEEE Transactions on Circuits and Systemsfor Video Technology, IEEE, USA, vol. 26, No. 1, Jan. 1, 2016 (Jan. 1, 2016), pp. 50-62, XP011592177, ISSN: 1051-8215, DOI: 10.1109/TCSVT.2015.2478706. 13 pages.

Supplementary European Search Report in the European application No. 19918532.3, dated May 3, 2022. 9 pages.

Written Opinion of the International Search Authority in the international application No. PCT/CN2019/077536, dated Nov. 29, 2019. 10 pages with English translation.

International Search Report in the international application No. PCT/CN2019/077536, dated Nov. 29, 2019.

Joint Video Experts Team (JVET) of ITU-T SG 16 WP 3 and ISO/IEC JTC 1/SC 29/WG 11 Document: JVET-K0076-v3, 11th Meeting: Ljubljana, SI, Jul. 10-18, 2018, Title: CE8-2.2: Current picture referencing using reference index signaling, Status: Input document to JVET, Purpose: Proposal, Source: Tencent America.

Joint Video Experts Team (JVET) of ITU-T SG 16 WP 3 and ISO/IEC JTC 1/SC 29/WG 11 Document: JVET-K1002-v2, 11th Meeting: Ljubljana, SI, Jul. 10-18, 2018, Title: Algorithm description for Versatile Video Coding and Test Model 2 (VTM 2), Status: Output document of JVET, Purpose: Algorithm description for Versatile Video Coding and Test Model 2, Source: Editors.

\* cited by examiner

PREDICTION METHOD, ENCODER, DECODER AND COMPUTER STORAGE MEDIUM

CROSS REFERENCE TO RELATED APPLICATION

This is a continuation of International Application No. PCT/CN2019/077536, filed on Mar. 8, 2019, and entitled "PREDICTION METHOD, ENCODER, DECODER AND COMPUTER STORAGE MEDIUM". The disclosure of the application is hereby incorporated by reference in its entirety.

TECHNICAL FIELD

Embodiments of the present disclosure relate to the technical field of video coding and decoding, and particularly to a prediction method, an encoder, a decoder and a computer storage medium.

BACKGROUND

With the rapid development of sciences and technologies, requirements of users on video watching and processing have been higher and higher, and particularly, demands of users in Screen Content Videos (SCVs) have increased day by day. High Efficiency Video Coding (HEVC) was proposed to adapt to videos with high resolutions and high frame rates, but the efficiency of typical Screen Content Coding (SCC) is not improved greatly. Therefore, for characteristics of high contrast, limited color data, more duplicated regions, etc., of a screen content, an extended coding standard, i.e., SCC, has been proposed based on HEVC.

In most coding standards, adaptive inter/intra prediction is used based on blocks. For example, in the SCC standard, a basic block unit for video coding is called a Coding Unit (CU), and the same coding parameter is shared for samples in the CU to improve the coding efficiency. As a latest coding and decoding technology, affine motion estimation and compensation may track a more complex motion effectively, such as rotation, scaling and transformation of a moving object, and is mainly applied to SCC of an intra prediction type at present. For the intra prediction type, an Intra. Block Copy (IBC) coding mode generally used in existing solutions only considers a Two-Dimensional (2D) translation motion model, and thus there is still a room for further optimization of coding.

DETAILED DESCRIPTION

Figure 1:
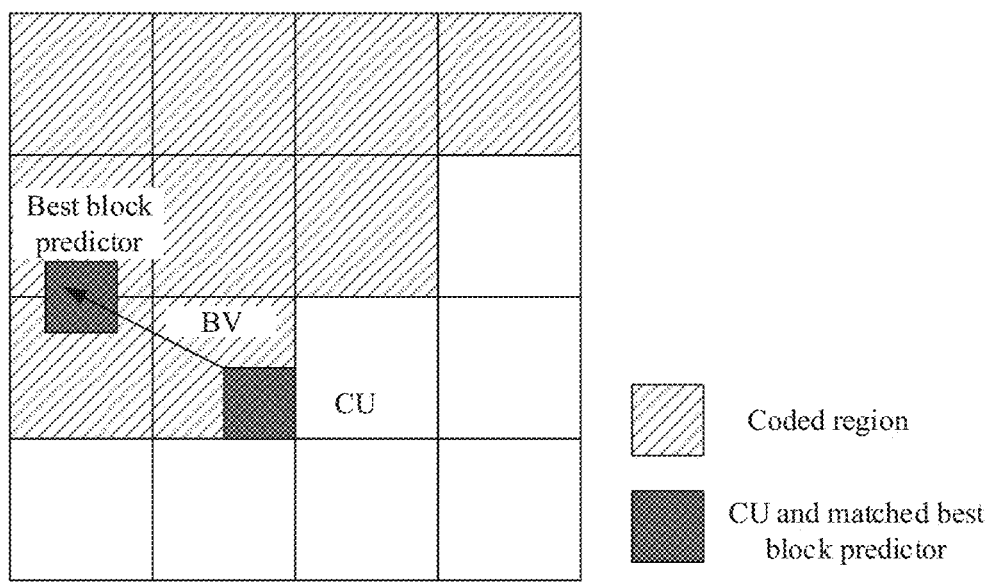
FIG. 1 is a structure diagram of an IBC mode according to a related technical solution.

In order to make the characteristics and technical contents of the embodiments of the present disclosure understood in more detail, implementation of the embodiments of the present disclosure will be described below in combination with the drawings in detail. The appended drawings are only adopted for description as references and not intended to limit the embodiments of the present disclosure.

The JVET is a working team set up by the Video Coding Experts Group (VCEG) of the International Telecommunication Union Telecommunication Standardization Sector (ITU-T) and the Moving Picture Experts Group (MPEG) of the International Organization for Standardization (ISO)/ International Electro technical Commission (IEC) in October, 2015. The mission of the working team is to set a next-generation video coding standard. A Joint Exploration Test Model (JEM) is a universal reference software platform, and verification of different coding tools is implemented based on this platform. The JVET formally named the next-generation video coding standard after Versatile Video Coding (VVC) in April, 2018, and a corresponding test model is a View Transformation Model (VTM). In July, 2018, the JEVT hammered out algorithm descriptions and coding methods of VVC working draft 2 and VTM2 in the 11th meeting. Based on an original HEVC Test Model (HM), the JVET adds more novel tools, for example, a Quadtree with nested multi-type tree (MT) (consisting of structures of a Quad Tree (QT), a Binary Tree (BT) and a Trigeminal Tree (TT)), affine motion compensation, Sub-Block Based Temporal Motion Vector Prediction (SbTMVP) and Adaptive Motion Vector Resolution (AMVR).

A basic principle of video coding compression is to remove a redundancy as much as possible by use of a correlation between a space domain, a time domain and a codeword. At present, a popular coding manner is to implement video coding compression by use of a block-based hybrid video coding framework through steps of prediction (including intra prediction and inter prediction), transformation, quantization, entropy coding, etc. Such a coding framework is high in vitality, and the block-based hybrid video coding framework is still used for HEVC.

According to a characteristic of a screen content, an SCC standard is extended based on HEVC, and standardization of the standard has been completed basically in 2016. Coding technologies such as IBC, a Palette Mode (PLT), Adaptive Color Transform (ACT) and AMVR are added to the SCC standard to improve the coding efficiency. When intra prediction is performed by SCC, besides a Conventional Intra Prediction (CIP) mode, an IBC mode may also be included. The IBC mode is a coding method like motion compensation, and a reference block matched with a current coding block is found from a current frame and is represented by a block Vector (BV). The IBC mode will be introduced below in combination with FIG. 1 in detail.

The embodiments of the present disclosure provide a prediction method, an encoder, a decoder and a computer storage medium. Affine motion estimation is added to eliminate non-translation motions, such as scaling, rotation and transformation, of a coding block of an intra prediction type in a screen image, reduce the number of coded bits and further improve a coding rate.

The technical solutions of the embodiments of the present disclosure may be implemented as follows.

According to a first aspect, the embodiments of the present disclosure provide a prediction method, which may be applied to an encoder and include the following operations.

For a coding mode used for a coding block in an original picture, a candidate list corresponding to the coding mode is created, the coding mode including a first affine motion mode or a second affine motion mode, a reference block in the candidate list being spatially neighboring to the coding block, and the reference block being coded in the first affine motion mode or the second affine motion mode.

Affine motion estimation is performed on the coding block according to the candidate list corresponding to the coding mode to obtain a coding parameter corresponding to the coding block.

Predictive coding is performed on the coding block based on the coding parameter corresponding to the coding block.

In an example, before creating the candidate list corresponding to the coding mode for the coding mode used for the coding block in the original picture, the method further includes: setting the original picture as a reference frame corresponding to the coding block, to perform intra predictive coding on the coding block in the first affine motion mode or the second affine motion mode.

In an example, before creating the candidate list corresponding to the coding mode for the coding mode used for the coding block in the original picture, the method further includes: when the reference frame corresponding to the coding block is the original picture and the coding block is coded by Intra Block Copy (IBC) with Affine (IBCAffine), determining that the coding mode used for the coding block is the first affine motion mode, and setting a value of a merge flag Merge_Flag of the coding block to a first value; and when the reference frame corresponding to the coding block is the original picture and the coding block is coded by IBC with Affine Merge (IBCAffineMerge), determining that the coding mode used for the coding block is the second affine motion mode, and setting the value of the merge flag Merge_Flag of the coding block to a second value, the first value being different from the second value.

In an example, the operation of creating the candidate list corresponding to the coding mode includes: when the coding mode is the first affine motion mode, sequentially accessing neighbor blocks of the coding block according to a first preset sequence to obtain a first candidate set, the first candidate set comprising two neighbor blocks, and the two neighbor blocks being coded in the first affine motion mode or the second affine motion mode; and creating a first candidate list corresponding to the first affine motion mode based on the first candidate set, a first reference block in the first candidate list being obtained from the first candidate set.

In an example, the operation of performing affine motion estimation on the coding block according to the candidate list corresponding to the coding mode to obtain the coding parameter corresponding to the coding block includes: when the coding mode is the first affine motion mode, traversing the first candidate list to acquire Motion Vector Predictors (MVPs) of at least two control points corresponding to each first reference block in the first candidate list, performing affine motion estimation calculation on the coding block by taking the MVPs of the at least two control points corresponding to each first reference block as starting points of affine search to obtain Motion Vectors (MVs) of control points at corresponding positions of the coding block, and acquiring a first coding parameter corresponding to the coding block from the MVs, the first coding parameter representing a group of coding parameters that are obtained in the first affine motion mode for the coding block and have a minimum coding prediction cost. The operation of performing predictive coding on the coding block based on the coding parameter corresponding to the coding block includes: performing predictive coding on the coding block based on the first coding parameter corresponding to the coding block.

In an example, the operation of performing affine motion estimation calculation on the coding block by taking the MVPs of the at least two control points corresponding to each first reference block as the starting points of affine search to obtain the MVs of the control points at the corresponding positions of the coding block includes: calculating a predictor of at least one sample of the coding block in the corresponding reference frame based on the MVPs of the at least two control points corresponding to each first reference block; performing an iterative operation on a matching error of the at least one sample of the coding block between the original picture and the reference frame and a gradient matrix of the predictor, and updating the MVs according to the iterative operation; when a count of the iterative operation meets a preset count threshold, obtaining updated MVs; and determining the updated MVs as the MVs of the control points at the corresponding positions of the coding block.

In an example, the operation of creating the candidate list corresponding to the coding mode includes: when the coding mode is the second affine motion mode, sequentially accessing the neighbor blocks of the coding block according to a second preset sequence to obtain a second candidate set, the second candidate set comprising at least one neighbor block, and the at least one neighbor block being coded in the first affine motion mode or the second affine motion mode; and creating a second candidate list corresponding to the second affine motion mode based on the second candidate set, a second reference block in the second candidate list being obtained from the second candidate set.

In an example, the operation of performing affine motion estimation on the coding block according to the candidate list corresponding to the coding mode to obtain the coding parameter corresponding to the coding block includes: when the coding mode is the second affine motion mode, traversing the second candidate list to acquire MVPs of at least two control points corresponding to each second reference block in the second candidate list, calculating MVs of control points at corresponding positions of the coding block based on the MVPs of the at least two control points corresponding to each second reference block, and acquiring a second coding parameter corresponding to the coding block from the MVs, the second coding parameter representing a group of coding parameters that are obtained in the second affine motion mode for the coding block and have a minimum coding prediction cost. The operation of performing predictive coding on the coding block based on the coding parameter corresponding to the coding block includes: performing predictive coding on the coding block based on the second coding parameter corresponding to the coding block.

In an example, after performing predictive coding on the coding block based on the coding parameter corresponding to the coding block, the method further includes: sending a bitstream corresponding to the coding block, the bitstream at least comprising a group of coding parameters that are obtained by non-translation motion estimation in the coding mode for the coding block and have a minimum coding prediction cost, and the coding parameter at least comprising the value of Merge_Flag.

According to a second aspect, the embodiments of the present disclosure provide a prediction method, which may be applied to a decoder and include the following operations.

For a coding block in an original picture, a coding mode used for the coding block is determined, the coding mode including a first affine motion mode or a second affine motion mode.

A candidate list corresponding to the coding mode is created based on the determined coding mode, a reference block in the candidate list being spatially neighboring to the coding block, and the reference block being coded in the first affine motion mode or the second affine motion mode.

A decoding parameter corresponding to the coding block is obtained according to the candidate list corresponding to the coding mode.

Predictive decoding is performed on the coding block based on the decoding parameter corresponding to the coding block.

In an example, before determining the coding mode used for the coding block, the method further includes: receiving a bitstream corresponding to the coding block, the bitstream at least comprising a group of coding parameters that are obtained by non-translation motion estimation in the coding mode for the coding block and have a minimum coding prediction cost, and the coding parameter at least comprising a value of Merge_Flag.

In an example, before determining the coding mode used for the coding block, the method further includes: after the bitstream corresponding to the coding block is received, determining whether the original picture is a reference frame corresponding to the coding block; when the original picture is the reference frame corresponding to the coding block, determining to perform intra predictive coding on the coding block in the first affine motion mode or the second affine motion mode; and when the original picture is not the reference frame corresponding to the coding block, determining to perform inter predictive coding on the coding block.

In an example, the operation of determining the coding mode used for the coding block includes: when the reference frame corresponding to the coding block is the original picture and the value of Merge_Flag is a first value, determining that the coding mode used for the coding block is the first affine motion mode; and when the reference frame corresponding to the coding block is the original picture and the value of Merge_Flag is a second value, determining that the coding mode used for the coding block is the second affine motion mode, the first value being different from the second value.

In an example, the operation of creating the candidate list corresponding to the coding mode based on the determined coding mode includes: when the coding mode is the first affine motion mode, sequentially accessing neighbor blocks of the coding block according to a first preset sequence to obtain a first candidate set, the first candidate set comprising two neighbor blocks, and the two neighbor blocks being coded in the first affine motion mode or the second affine motion mode; and creating a first candidate list corresponding to the first affine motion mode based on the first candidate set, a first reference block in the first candidate list being obtained from the first candidate set.

In an example, the operation of obtaining the decoding parameter corresponding to the coding block according to the candidate list corresponding to the coding mode includes: when the coding mode is the first affine motion mode, after the bitstream corresponding to the coding block is received, acquiring a first coding parameter corresponding to the coding block from the bitstream, the first coding parameter representing a group of coding parameters that are obtained by non-translation motion estimation in the first affine motion mode for the coding block and have a minimum coding prediction cost, and obtaining a first decoding parameter corresponding to the coding block based on the first candidate list and the first coding parameter. The operation of performing predictive decoding on the coding block based on the decoding parameter corresponding to the coding block includes: performing predictive decoding on the coding block based on the first decoding parameter corresponding to the coding block.

In an example, the operation of creating the candidate list corresponding to the coding mode based on the determined coding mode includes: when the coding mode is the second affine motion mode, sequentially accessing the neighbor blocks of the coding block according to a second preset sequence to obtain a second candidate set, the second candidate set comprising at least one neighbor block, and the at least one neighbor block being coded in the first affine motion mode or the second affine motion mode; and creating a second candidate list corresponding to the second affine motion mode based on the second candidate set, a second reference block in the second candidate list being obtained from the second candidate set.

In an example, the operation of obtaining the decoding parameter corresponding to the coding block according to the candidate list corresponding to the coding mode includes: when the coding mode is the second affine motion mode, after the bitstream corresponding to the coding block is received, acquiring a second coding parameter corresponding to the coding block from the bitstream, the second coding parameter representing a group of coding parameters that are obtained by non-translation motion estimation in the second affine motion mode for the coding block and have a minimum coding prediction cost, and obtaining a second decoding parameter corresponding to the coding block based on the second candidate list and the second coding parameter. The operation of performing predictive decoding on the coding block based on the decoding parameter corresponding to the coding block includes: performing predictive decoding on the coding block based on the second decoding parameter corresponding to the coding block.

According to a third aspect, the embodiments of the present disclosure provide an encoder, which may include a first creation unit, a first estimation unit and a coding prediction unit.

The first creation unit may be configured to, for a coding mode used for a coding block in an original picture, create a candidate list corresponding to the coding mode, the coding mode including a first affine motion mode or a second affine motion mode, a reference block in the candidate list being spatially neighboring to the coding block, and the reference block being coded in the first affine motion mode or the second affine motion mode.

The first estimation unit may be configured to perform affine motion estimation on the coding block according to the candidate list corresponding to the coding mode to obtain a coding parameter corresponding to the coding block.

The coding prediction unit may be configured to perform predictive coding on the coding block based on the coding parameter corresponding to the coding block.

In an example, the encoder further includes a setting unit, configured to set the original picture as a reference frame corresponding to the coding block to perform intra predictive coding on the coding block in the first affine motion mode or the second affine motion mode.

In an example, the setting unit is further configured to, when the reference frame corresponding to the coding block is the original picture and the coding block is coded by Intra Block Copy (IBC) with Affine (IBCAffine), determine that the coding mode used for the coding block is the first affine motion mode and set a value of a merge flag Merge_Flag of the coding block to a first value, and when the reference frame corresponding to the coding block is the original picture and the coding block is coded by IBC with Affine Merge (IBCAffineMerge), determine that the coding mode used for the coding block is the second affine motion mode and set the value of the merge flag Merge_Flag of the coding block to a second value, the first value being different from the second value.

In an example, the first creation unit is configured to, when the coding mode is the first affine motion mode, sequentially access neighbor blocks of the coding block according to a first preset sequence to obtain a first candidate set, the first candidate set comprising two neighbor blocks, and the two neighbor blocks being coded in the first affine motion mode or the second affine motion mode, and create a first candidate list corresponding to the first affine motion mode based on the first candidate set, a first reference block in the first candidate list being obtained from the first candidate set.

In an example, the first estimation unit is configured to, when the coding mode is the first affine motion mode, traverse the first candidate list to acquire Motion Vector Predictors (MVPs) of at least two control points corresponding to each first reference block in the first candidate list, perform affine motion estimation calculation on the coding block by taking the MVPs of the at least two control points corresponding to each first reference block as starting points of affine search to obtain Motion Vectors (MVs) of control points at corresponding positions of the coding block, and acquire a first coding parameter corresponding to the coding block from the MVs, the first coding parameter representing a group of coding parameters that are obtained in the first affine motion mode for the coding block and have a minimum coding prediction cost. The coding prediction unit is configured to perform predictive coding on the coding block based on the first coding parameter corresponding to the coding block.

In an example, the first estimation unit is configured to calculate a predictor of at least one sample of the coding block in the corresponding reference frame based on the MVPs of the at least two control points corresponding to each first reference block, perform an iterative operation on a matching error of the at least one sample of the coding block between the original picture and the reference frame and a gradient matrix of the predictor, update the MVs according to the iterative operation, when a count of the iterative operation meets a preset count threshold, obtain updated MVs, and determine the updated MVs as the MVs of the control points at the corresponding positions of the coding block.

In an example, the first creation unit is configured to, when the coding mode is the second affine motion mode, sequentially access the neighbor blocks of the coding block according to a second preset sequence to obtain a second candidate set, the second candidate set comprising at least one neighbor block, and the at least one neighbor block being coded in the first affine motion mode or the second affine motion mode, and create a second candidate list corresponding to the second affine motion mode based on the second candidate set, a second reference block in the second candidate list being obtained from the second candidate set.

In an example, the first estimation unit is configured to, when the coding mode is the second affine motion mode, traverse the second candidate list to acquire MVPs of at least two control points corresponding to each second reference block in the second candidate list, calculate MVs of control points at corresponding positions of the coding block based on the MVPs of the at least two control points corresponding to each second reference block, and acquire a second coding parameter corresponding to the coding block from the MVs, the second coding parameter representing a group of coding parameters that are obtained in the second affine motion mode for the coding block and have a minimum coding prediction cost; and the coding prediction unit is configured to perform predictive coding on the coding block based on the second coding parameter corresponding to the coding block.

In an example, the encoder further includes a sending unit, configured to send a bitstream corresponding to the coding block, the bitstream at least comprising a group of coding parameters that are obtained by non-translation motion estimation in the coding mode for the coding block and have a minimum coding prediction cost, and the coding parameter at least comprising the value of Merge_Flag.

According to a fourth aspect, the embodiments of the present disclosure provide a decoder, which may include a determination unit, a second creation unit, a second estimation unit and a decoding prediction unit.

The determination unit may be configured to, for a coding block in an original picture, determine a coding mode used for the coding block, the coding mode including a first affine motion mode or a second affine motion mode.

The second creation unit may be configured to create a candidate list corresponding to the coding mode based on the determined coding mode, a reference block in the candidate list being spatially neighboring to the coding block, and the reference block being coded in the first affine motion mode or the second affine motion mode.

The second estimation unit may be configured to obtain a decoding parameter corresponding to the coding block according to the candidate list corresponding to the coding mode.

The decoding prediction unit may be configured to perform predictive decoding on the coding block based on the decoding parameter corresponding to the coding block.

In an example, the decoder further includes a receiving unit, configured to receive a bitstream corresponding to the coding block, the bitstream at least comprising a group of coding parameters that are obtained by non-translation motion estimation in the coding mode for the coding block and have a minimum coding prediction cost, and the coding parameter at least comprising a value of Merge_Flag.

In an example, the decoder further includes a judgment unit, configured to, after the bitstream corresponding to the coding block is received, determine whether the original picture is a reference frame corresponding to the coding block. The determination unit is further configured to, when the original picture is the reference frame corresponding to the coding block, determine to perform intra predictive coding on the coding block in the first affine motion mode or the second affine motion mode, and when the original picture is not the reference frame corresponding to the coding block, determine to perform inter predictive coding on the coding block.

In an example, the determination unit is configured to, when the reference frame corresponding to the coding block is the original picture and the value of Merge_Flag is a first value, determine that the coding mode used for the coding block is the first affine motion mode, and when the reference frame corresponding to the coding block is the original picture and the value of Merge_Flag is a second value, determine that the coding mode used for the coding block is the second affine motion mode, the first value being different from the second value.

In an example, the second creation unit is configured to, when the coding mode is the first affine motion mode, sequentially access neighbor blocks of the coding block according to a first preset sequence to obtain a first candidate set, the first candidate set comprising two neighbor blocks, and the two neighbor blocks being coded in the first affine motion mode or the second affine motion mode, and create a first candidate list corresponding to the first affine motion mode based on the first candidate set, a first reference block in the first candidate list being obtained from the first candidate set.

In an example, the second estimation unit is configured to, when the coding mode is the first affine motion mode, after the bitstream corresponding to the coding block is received, acquire a first coding parameter corresponding to the coding block from the bitstream, the first coding parameter representing a group of coding parameters that are obtained by non-translation motion estimation in the first affine motion mode for the coding block and have a minimum coding prediction cost, and obtain a first decoding parameter corresponding to the coding block based on the first candidate list and the first coding parameter; and the decoding prediction unit is configured to perform predictive decoding on the coding block based on the first decoding parameter corresponding to the coding block.

In an example, the second creation unit is configured to, when the coding mode is the second affine motion mode, sequentially access the neighbor blocks of the coding block according to a second preset sequence to obtain a second candidate set, the second candidate set comprising at least one neighbor block, and the at least one neighbor block being coded in the first affine motion mode or the second affine motion mode, and create a second candidate list corresponding to the second affine motion mode based on the second candidate set, a second reference block in the second candidate list being obtained from the second candidate set.

In an example, the second estimation unit is configured to, when the coding mode is the second affine motion mode, after the bitstream corresponding to the coding block is received, acquire a second coding parameter corresponding to the coding block from the bitstream, the second coding parameter representing a group of coding parameters that are obtained by non-translation motion estimation in the second affine motion mode for the coding block and have a minimum coding prediction cost, and obtain a second decoding parameter corresponding to the coding block based on the first candidate list and the second coding parameter. The decoding prediction unit is configured to perform predictive decoding on the coding block based on the second decoding parameter corresponding to the coding block.

According to a fifth aspect, the embodiments of the present disclosure provide an encoder, which may include a first memory and a first processor.

The first memory may be configured to store a computer program capable of running in the first processor.

The first processor may be configured to run the computer program to execute the steps of the method as described in the first aspect.

According to a sixth aspect, the embodiments of the present disclosure provide a decoder, which may include a second memory and a second processor.

The second memory may be configured to store a computer program capable of running in the second processor.

The second processor may be configured to run the computer program to execute the steps of the method as described in the second aspect.

According to a seventh aspect, the embodiments of the present disclosure provide a computer storage medium, which may store a prediction program. The prediction program may be executed by a first processor to implement the steps of the method as described in the first aspect, or may be executed by a second processor to implement the steps of the method as described in the second aspect.

The embodiments of the present disclosure provide the prediction method, the encoder, the decoder and the computer storage medium. On an encoder side, the encoder creates the candidate list corresponding to the coding mode for the coding mode used for the coding block in the original picture, the coding mode including the first affine motion mode or the second affine motion mode, the reference block in the candidate list being spatially neighboring to the coding block, and the reference block is coded in the first affine motion mode or the second affine motion mode, the encoder performs affine motion estimation on the coding block according to the candidate list corresponding to the coding mode to obtain the coding parameter corresponding to the coding block, and performs predictive coding on the coding block based on the coding parameter corresponding to the coding block. On a decoder side, the decoder determines the coding mode used for the coding block, the coding mode including the first affine motion mode or the second affine motion mode, the decoder creates the candidate list corresponding to the coding mode based on the determined coding mode, the reference block in the candidate list being spatially neighboring to the coding block, and the reference block being coded in the first affine motion mode or the second affine motion mode, the decoder obtains the decoding parameter corresponding to the coding block according to the candidate list corresponding to the coding mode, and performs predictive decoding on the coding block based on the decoding parameter corresponding to the coding block. Since affine motion estimation is additionally performed on the encoder side, non-translation motions, such as scaling, rotation and transformation, of a coding block of an intra prediction type in a screen image may be eliminated, the number of coded bits is reduced, and a coding rate is further improved.

Referring to FIG. 1, a structure diagram of an IBC mode according to a related technical solution is illustrated. As illustrated in FIG. 1, the slashed regions are search regions (i.e., coded regions in a current picture), the black shaded blocks are a current CU and a matched best block predictor respectively, and a distance between the current CU and the matched best block predictor is called a BV. In an existing extended HEVC standard, i.e., an HEVC-SCC standard, an IBC coding technology is proposed for SCC. A basic idea thereof is like conventional inter motion estimation, namely a coded region of a current frame is searched for a reference block matched with a block to be coded to obtain a distance between the two blocks, the distance being called a BV, then a predicted residual is acquired based on the BV, and finally, the block to be coded is coded.

In a latest solution for a VVC reference model BMS2.1, the IBC mode, also called a Coding Picture Reference (CPR) mode, is mainly used for SCC. Here, the IBC mode may further be divided into an IBC Non-Merge mode and an IBC Merge mode, and the two modes are applied to a coding block smaller than or equal to 16×16. However, in the IBC mode, the reference block matched with the coding block is still obtained based on a translation motion model, and consequently, relatively high coding efficiency may be achieved in the IBC mode only for blocks repeatedly appearing in a screen content. In an SCC scenario, there may also be such complex motion conditions of scaling, rotation and transformation, and thus there is still a room for further optimization of coding prediction.

The embodiments of the present disclosure provide a prediction method. Based on an IBC mode, a translation motion model is replaced with an affine motion model. Since affine motion estimation is added, non-translation motions, such as scaling, rotation and transformation, of a coding block of an intra prediction type in a screen image are eliminated, the number of coded bits is reduced, and a coding rate is further improved. The prediction method provided in the embodiments of the present disclosure may be applied not only to an encoder but also to a decoder, or may even be implemented by cooperation of the encoder and the decoder. No specific limits are made in the embodiments of the present disclosure.

Each embodiment of the present disclosure will be described below in combination with the drawings in detail.

First Embodiment

Figure 2:
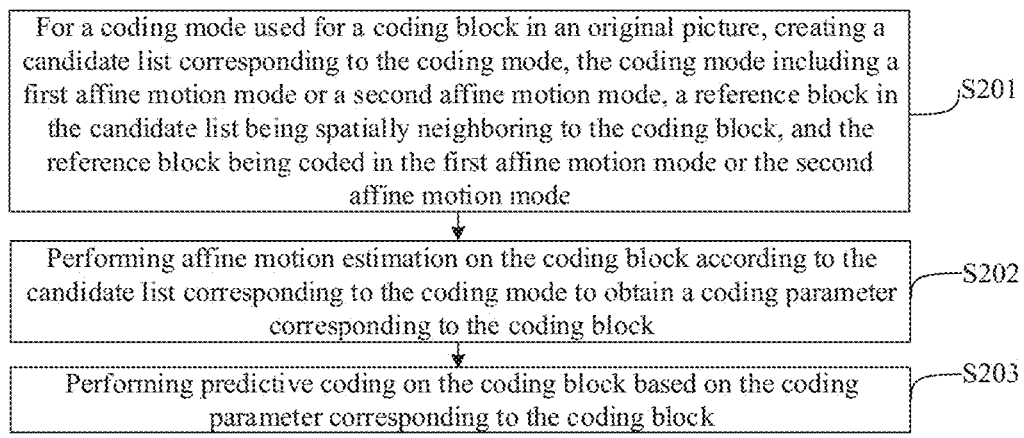
FIG. 2 is a flowchart of a prediction method according to an embodiment of the present disclosure.

Referring to FIG. 2, a flow example of a prediction method according to an embodiment of the present disclosure is illustrated. The method is applied to an encoder. The method may include the following operations.

In S201, for a coding mode used for a coding block in an original picture, a candidate list corresponding to the coding mode is created, the coding mode including a first affine motion mode or a second affine motion mode, a reference block in the candidate list being spatially neighboring to the coding block, and the reference block being coded in the first affine motion mode or the second affine motion mode.

In S202, affine motion estimation is performed on the coding block according to the candidate list corresponding to the coding mode to obtain a coding parameter corresponding to the coding block.

In S203, predictive coding is performed on the coding block based on the coding parameter corresponding to the coding block.

It is to be noted that affine motion estimation specifically refers to non-translation motion estimation, and is used to eliminate non-translation motions, such as scaling, rotation and transformation, of a coding block of an intra prediction type in a screen image. After the coding mode is determined, "affine motion estimation may be performed on the coding block according to the candidate list" to acquire multiple groups of coding parameters in the coding mode. Coding prediction cost calculation is performed for different coding parameters respectively to obtain coding prediction costs corresponding to the different coding parameters. A minimum value is selected from these coding prediction costs, and the group of coding parameters corresponding to the minimum value are determined as coding parameters corresponding to the coding mode, to perform predictive coding on the coding block. Here, calculation of the coding prediction cost may refer to calculation of a Rate Distortion Cost (RD cost), or may refer to calculation of a Sum of Absolute Differences Cost (SAD cost), or may refer to calculation of a to-be-transmitted bit number cost (for example, a sum of a predicted residual and the number of bits needed for transmission of a group of BVs of the coding block). No specific limits are made in the embodiment of the present disclosure.

It is also to be noted that many coding modes may be used for the coding block on an encoder side. For the intra prediction type, an IBC Non-Merge mode and an IBC Merge mode are included, and the first affine motion mode and the second affine motion mode may further be included. For an inter prediction type, an inter affine motion mode may be included. In the embodiment of the present disclosure, the coding block is a coding block to be coded in the original picture, and is set to the intra prediction type. The first affine motion mode and the second affine motion mode will mainly be described below in detail.

In the embodiment of the present disclosure, for the coding block in the original picture, the candidate list corresponding to the coding mode is created at first according to the coding mode used for the coding block. The coding mode includes the first affine motion mode or the second affine motion mode. The reference block in the candidate list is spatially neighboring to the coding block. The reference block is coded in the first affine motion mode or the second affine motion mode. Then, affine motion estimation is performed on the coding block according to the candidate list corresponding to the coding mode to obtain the coding parameter corresponding to the coding block. Finally, predictive coding is performed on the coding block based on the coding parameter corresponding to the coding block. In the embodiment of the present disclosure, since affine motion estimation is added, complex non-translation motion conditions, such as scaling, rotation and transformation, of the coding block of the intra prediction type in the screen image may be eliminated, the number of coded bits is reduced, and a coding rate is further improved.

Figure 3A:
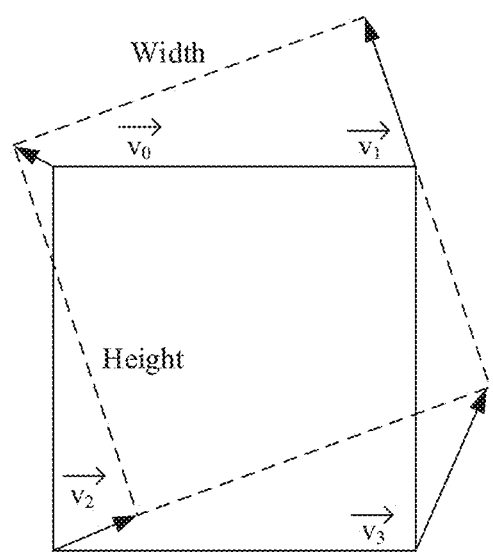
FIG. 3A and FIG. 3B are structure diagrams of a non-translation motion of a coding block according to an embodiment of the present disclosure.
Figure 3B:
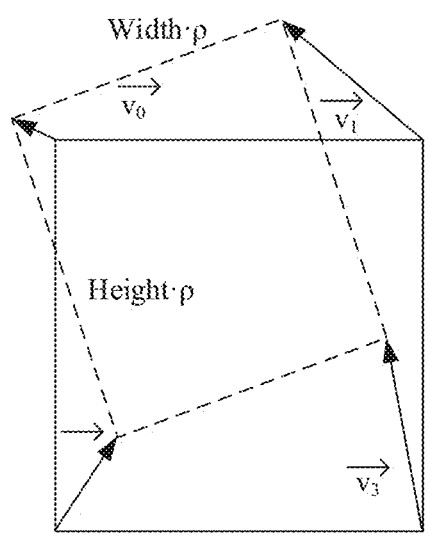

It can be understood that affine motion estimation is a novel technology for the inter prediction type. In HEVC, inter prediction is based on motion compensation of a coding block, and a translation motion model is usually used for non-translation motion estimation. That is, there is made such a hypothesis that MVs of all samples in a coding block are the same and are usually replaced with a BV of a top-left vertex of the coding block. However, in practical applications, the coding block may also have non-translation motions such as a scaling motion, a rotational rotation and a transformation motion. FIG. 3A and FIG. 3B show a rotational motion of a coding block and a scaling motion of the coding block respectively. ρ is a scaling coefficient, and a value of ρ is specifically set according to a practical condition. No specific limits are made in the embodiment of the present disclosure.

Figure 4A:
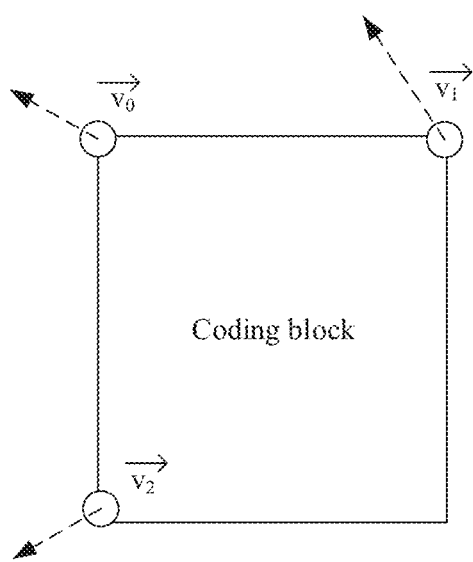
FIG. 4A is a schematic diagram of Motion Vectors (MVs) of at least two control points associated with a coding block according to an embodiment of the present disclosure.

Here, affine motion estimation implements motion compensation through MVs of control points. The control points are represented in two modes, for example, two control points and three control points. A reference block (or called a mapped block) corresponding to the coding block may be found from a reference frame by use of the MVs of the control points. Referring to FIG. 4A, a schematic diagram of MVs of at least two control points associated with a coding block according to an embodiment of the present disclosure is illustrated. When two control points, i.e., MVs of top-left and top-right vertexes, are adopted for the coding block, namely $\vec{v}_0$ and $\vec{v}_1$ illustrated in FIG. 4A, an affine model is also called a four-parameter affine model. When three control points, i.e., MVs of top-left, top-right and bottom-left vertexes, are adopted for the coding block, namely $\vec{v}_0$, $\vec{v}_1$ and $\vec{v}_2$ illustrated in FIG. 4A, the affine model is also called a six-parameter affine model.

If the four-parameter affine model is adopted, an MV of each 4×4 sub block in the coding block may be deduced through a formula (1):

$$\begin{cases} v_x = \dfrac{v_{1x} - v_{0x}}{w} x + \dfrac{v_{1y} - v_{0y}}{w} y + v_{0x} \\ v_y = \dfrac{v_{1y} - v_{0y}}{w} x + \dfrac{v_{1x} - v_{0y}}{w} y + v_{0y} \end{cases} \quad (1)$$

If the six-parameter affine model is adopted, the MV of each 4×4 sub block in the coding block may be deduced through a formula (2):

$$\begin{cases} v_x = \dfrac{v_{1x} - v_{0x}}{w} x + \dfrac{v_{2x} - v_{0x}}{h} y + v_{0x} \\ v_y = \dfrac{v_{1y} - v_{0y}}{w} x + \dfrac{v_{2y} - v_{0y}}{h} y + v_{0y} \end{cases} \quad (2)$$

w and h represent a width and height of the coding block respectively, the MV of the top-left vertex is $\vec{v}_0 = (v_{0x}, v_{0y})$, the MV of the top-right vertex is $\vec{v}_1 = (v_{1x}, v_{1y})$, the MV at the bottom-left vertex is $\vec{v}_2 = (v_{2x}, v_{2y})$, and an MV corresponding to each sample (x,y) in the coding block is $\vec{v} = (v_x, v_y)$.

For the inter affine motion mode, a bitstream sent to a decoder by the encoder further includes two flags, i.e., Affine_Flag and Affine Type_Flag. Here, Affine_Flag is configured to identify whether inter affine motion estimation compensation is used for the coding block. Affine Type_Flag is configured to identify an affine model used for the coding block. Specifically, when a value of Affine_Flag is set to 1, it indicates that inter affine motion estimation compensation is used for the coding block. When the value of Affine_Flag is set to 0, it indicates that inter affine motion estimation compensation is not used for the coding block. When a value of Affine Type_Flag is set to 1, it indicates that the affine model used for the coding block is the six-parameter affine model. When the value of Affine Type_Flag is set to 0, it indicates that the affine model used for the coding block is the four-parameter affine model.

Figure 4B:
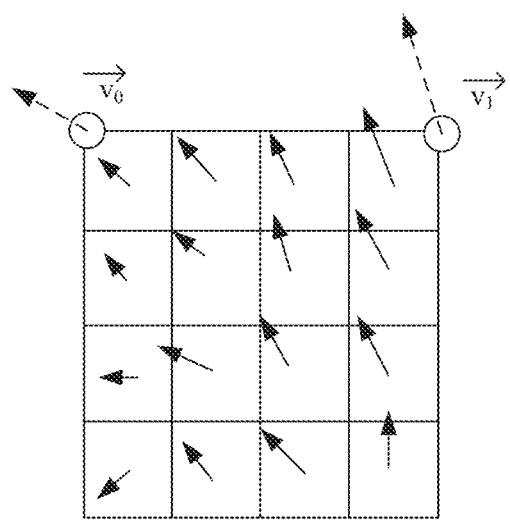
FIG. 4B is a schematic diagram of an MV sample of each sub block in a coding block according to an embodiment of the present disclosure.

Referring to FIG. 4B, a schematic diagram of an MV sample of each sub block in a coding block according to an embodiment of the present disclosure is illustrated. For an MV sample of each sub block illustrated in FIG. 4B, coding prediction of each sub block may be completed by use of a motion compensation difference filter in combination with the MVs deduced through the formula (1) or the formula (2). Therefore, complex motion conditions may be described better by affine motion compensation. In the embodiment of the present disclosure, affine motion estimation is applied to the coding block based on the intra prediction type, so that the number of the coded bits may further be reduced, and the coding rate is further improved.

In some embodiments, before the operation that the candidate list corresponding to the coding mode is created for the coding mode used for the coding block in the original picture, the method further includes the following operation.

The original picture is set as a reference frame corresponding to the coding block to perform intra predictive coding on the coding block in the first affine motion mode or the second affine motion mode.

Furthermore, before the operation that the candidate list corresponding to the coding mode is created for the coding mode used for the coding block in the original picture, the method further includes the following operations.

When the reference frame corresponding to the coding block is the original picture and the coding block is coded by IBC with Affine (IBCAffine), it is determined that the coding mode used for the coding block is the first affine motion mode, and a value of Merge_Flag of the coding block is set to a first value.

When the reference frame corresponding to the coding block is the original picture and the coding block is coded by IBC with Affine Merge (IBCAffineMerge), it is determined that the coding mode used for the coding block is the second affine motion mode, and the value of Merge_Flag of the coding block is set to a second value, the first value being different from the second value.

It is to be noted that the coding block is set to the intra prediction type, and thus the original picture is to be set as the reference frame corresponding to the coding block. For example, for frame I in a test sequence, an image type is to be modified to frame P at first, and then the current original picture is to be placed at the tail of REF_PIC_LIST_0 as a reference frame for coding prediction.

As such, if the reference frame corresponding to the coding block is the original picture and the coding block is coded by IBCAffine, it may be determined that the coding mode used for the coding block is the first affine motion mode. If the reference frame corresponding to the coding block is the original picture and the coding block is coded by IBCAffineMerge, it is determined that the coding mode used for the coding block is the second affine motion mode.

It is also to be noted that, for subsequently distinguishing the coding mode accurately, different flags may be set for distinguishing. Specifically, for distinguishing a conventional coding mode (such as an IBC Non-Merge mode and an IBC Merge mode) from the coding mode (such as the first affine motion mode and the second affine motion mode) of the embodiment of the present disclosure, a first flag (represented by IBCAffine_Flag) may be added for distinguishing in the embodiment of the present disclosure. Exemplarily, when the conventional coding mode is used, a value of IBCAffine_Flag may be set to the first value, and when the coding mode of the embodiment of the present disclosure is used, the value of IBCAffine_Flag may be set to the second value, the first value being different from the second value.

In addition, for distinguishing the first affine motion mode from the second affine motion mode, in the embodiment of the present disclosure, a second flag may be added for distinguishing, or existing Merge_Flag may be reused for distinguishing. In the embodiment of the present disclosure, descriptions are made with reusing Merge_Flag as an example. Exemplarily, when the coding mode is the first affine motion mode, the value of Merge_Flag of the coding block is set to the first value, and when the coding mode is the first affine motion mode, the value of Merge_Flag of the coding block is set to the second value, the first value being different from the second value.

In the embodiment of the present disclosure, the first value may be represented by a number, a letter, or a combination of letters, the second value may also be represented by a number, a letter or a combination of letters, but the first value is different from the second value. The first value may be 1, and the second value may be 0. Alternatively, the first value may be true, and the second value may be false. However, no specific limits are made in the embodiment of the present disclosure.

Besides the first flag (represented by IBCAffine_Flag) and the second flag (represented by Merge_Flag), the two flags (represented by Affine_Flag and Affine Type_Flag) for the inter affine motion mode may also be reused in the embodiment of the present disclosure. Affine_Flag is configured to distinguish whether affine motion estimation compensation is used for the coding block. Affine Type_Flag is configured to distinguish the affine model used for the coding block. Specifically, when the value of Affine_Flag is set to the first value, it indicates that affine motion estimation compensation is used for the coding block, namely the coding mode for the coding block may be the first affine motion mode or the second affine motion mode. When the value of Affine_Flag is set to the second value, it indicates that affine motion estimation compensation is not used for the coding block, namely the coding mode for the coding block may be an IBC mode. When the value of Affine Type_Flag is set to the first value, it indicates that the affine model used for the coding block is the six-parameter affine model. When the value of Affine Type_Flag is set to the second value, it indicates that the affine model used for the coding block is the four-parameter affine model. Here, the first value may be 1 or true, and the second value may be 0 or false.

For example, there is made such a hypothesis that the first value is true and the second value is false. When the coding mode for the coding block is the first affine motion mode, the value of IBCAffine_Flag is set to true, the value of Affine_Flag is set to true, and the value of Merge_Flag is set to true. When the coding mode for the coding block is the second affine motion mode, the value of IBCAffine_Flag is also set to true, the value of Affine_Flag is also set to true, while the value of Merge_Flag is set to false.

In some embodiments, the operation that the candidate list corresponding to the coding block is created includes the following operations.

When the coding mode is the first affine motion mode, neighbor blocks of the coding block are sequentially accessed according to a first preset sequence to obtain a first candidate set, the first candidate set including two neighbor blocks, and the two neighbor blocks being coded in the first affine motion mode or the second affine motion mode.

A first candidate list corresponding to the first affine motion mode is created based on the first candidate set, a first reference block in the first candidate list being obtained from the first candidate set.

Figure 5:
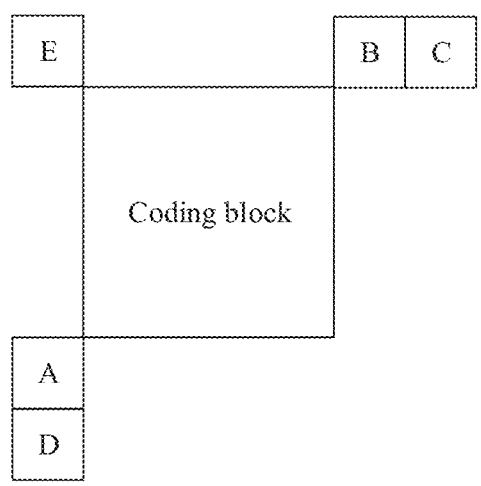
FIG. 5 is a structure diagram of creating a candidate list based on five neighbor blocks according to an embodiment of the present disclosure.

It is to be noted that the neighbor block forms a spatial neighboring relationship with the coding block. Referring to FIG. 5, a structure diagram of creating a candidate list based on five neighbor blocks according to an embodiment of the present disclosure is illustrated. For the first affine motion mode, for five neighbor blocks A, B, C, D and E illustrated in FIG. 5, the five neighbor blocks are sequentially accessed according to the first preset sequence (for example, a sequence of D→A and C→B→E). When a neighbor block is coded in the first affine motion mode or the second affine motion mode, namely the value of IBCAffine_Flag is true and the value of Affine_Flag is also true, the neighbor block meets a candidate requirement, and MVs of at least two control points of the neighbor block are used as a group of Motion Vector Predictors (MVPs). As such, for the first affine motion mode, two neighbor blocks meeting the candidate requirement may be selected from the neighbor blocks (D and A) on the left of the coding block and the neighbor blocks (C, B and E) at the top of the coding block respectively as first reference blocks in the first candidate list. Then, MVs of at least two control points of the neighbor block are used as a group of MVPs corresponding to the first reference block, to form the first candidate list.

Furthermore, the operation that affine motion estimation is performed on the coding block according to the candidate list corresponding to the coding mode to obtain the coding parameter corresponding to the coding block includes the following operations.

When the coding mode is the first affine motion mode, the first candidate list is traversed to acquire MVPs of at least two control points corresponding to each first reference block in the first candidate list.

Affine motion estimation calculation is performed on the coding block by taking the MVPs of the at least two control points corresponding to each first reference block as starting points of affine search to obtain MVs of control points at corresponding positions of the coding block.

A first coding parameter corresponding to the coding block is acquired from the MVs, the first coding parameter representing a group of coding parameters that are obtained in the first affine motion mode for the coding block and have a minimum coding prediction cost.

The operation that predictive coding is performed on the coding block based on the coding parameter corresponding to the coding block includes the following operation.

Predictive coding is performed on the coding block based on the first coding parameter corresponding to the coding block.

Furthermore, the operation that affine motion estimation calculation is performed on the coding block by taking the MVPs of the at least two control points corresponding to each first reference block as the starting points of affine search to obtain the MVs of the control points at the corresponding positions of the coding block includes the following operations.

A predictor of at least one sample of the coding block in the corresponding reference frame is calculated based on the MVPs of the at least two control points corresponding to each first reference block.

An iterative operation is performed on a matching error of the at least one sample of the coding block between the original picture and the reference frame and a gradient matrix of the predictor, and the MVs are updated according to the iterative operation.

When a count of the iterative operation meets a preset count threshold, updated MVs are obtained.

The updated MVs are determined as the MVs of the control points at the corresponding positions of the coding block.

It is to be noted that, in the first affine motion mode, the first candidate list is traversed at first to acquire the MVPs of the at least two control points corresponding to each first reference block in the first candidate list. Then, affine motion search is performed by taking the MVPs of the at least two control points corresponding to each first reference block as the starting points of affine search. In an affine search process, the four-parameter affine model or the six-parameter affine model may be tried respectively.

Specifically, for any sample $(x_i,y_i)$ in the coding block, a sample predictor $s_i$ at a corresponding position in the reference frame is represented through formula (3):

$$s_i = s'(x_i + \Delta x_i, y_i + \Delta y_i) \quad (3).$$

$\Delta x_i$ and $\Delta y_i$ represent the MVs of the coding block, and they are not changed linearly but determined by four parameters (a, b, $\omega_0$ and $\omega_1$) in the following formula (4):

$$\begin{cases} \overrightarrow{A} = (a \ b \ \omega_0 \ \omega_1) \\ \Delta x_i = \overrightarrow{A}^T \cdot (1 \ 0 \ x \ -y) \\ \Delta y_i = \overrightarrow{A}^T \cdot (0 \ 1 \ y \ x) \end{cases} \quad (4)$$

a and b represent translation components of a sample coordinate of the coding block in the reference frame after rotational transformation respectively, $\omega_0$ and $\omega_1$ represent parameters in a rotation matrix after scaling transformation is performed on the coding block based on the coefficient ρ, and $\overrightarrow{A}^T$ represents transpose of $\overrightarrow{A}$ from a row vector to a column vector.

First-order Taylor expansion is performed on formula (3) to obtain formula (5), as illustrated below:

$$\hat{s}(x_i, y_i) \approx s'(x_i, y_i) + \underbrace{\frac{\partial s'}{\partial x}\bigg|_{x=x_i,y=y_i}}_{G_{xi}} \times \Delta x_i + \underbrace{\frac{\partial s'}{\partial y}\bigg|_{x=x_i,y=y_i}}_{G_{yi}} \times \Delta y_i. \quad (5)$$

$G_{xi}$ and $G_{yi}$ represent gradient values, and they are obtained by Sobel gradient calculation. According to formula (5), a prediction error of any sample $(x_i,y_i)$ in the coding block may be calculated through the following formula (6):

$$\underbrace{e(x_i, y_i)}_{0} = \underbrace{s(x_i, y_i) - s'(x_i, y_i)}_{1} - \underbrace{(G_{xi} x_i G_{xi} + y_i G_{yi} \ G_{yi} y_i G_{yi} - x_i G_{yi})}_{2} \cdot \overrightarrow{A}. \quad (6)$$

Part 0 represents the prediction error of any sample $(x_i,y_i)$ in the coding block, part 1 represents the matching error of any sample $(x_i,y_i)$ in the coding block between the original picture and the reference frame, and part 2 represents the gradient matrix of the predictor of the sample at the corresponding position in the reference frame.

As such, affine motion estimation calculation is performed at first according to the presently selected four-parameter affine model or six-parameter affine model by taking the MVPs of the at least two control points corresponding to each first reference block in the first candidate list as the starting points of affine search. For example, if the four-parameter affine model is presently selected, the MVs of the control points at the corresponding positions of the coding block may be deduced according to formula (1). If the six-parameter affine model is presently selected, the MVs of the control points at the corresponding positions of the coding block may be deduced according to formula (2). Then, the iterative operation is performed according to the gradient of the predictor and the matching error. The iterative operation process is used to update the MVs. When the count of the iterative operation meets the preset count threshold, the prediction error is minimum, and the obtained MVs are the updated MVs that are finally needed.

It is also to be noted that the preset count threshold is a preset iteration count needed by determining that the prediction error is minimum. In the embodiment of the present disclosure, for the four-parameter affine model, the preset count threshold may be 5, and for the six-parameter affine model, the preset count threshold may be 4. In practical applications, the preset count threshold may specifically be set according to a practical condition. No specific limits are made in the embodiment of the present disclosure.

In the iteration process, a Block Vector with Affine Model (BVAffi) of the coding block in the first affine motion mode needs to meet the following condition: a reference point (represented by refPoint) found for the control point according to BVAffi, and reference points (represented by refPoint) found for other corner points (samples except the control point in four left-top, right-top, left-bottom and right-bottom points) according to MVs deduced through formula (1) or formula (2) have been coded. In addition, for reducing the complexity in coding, the reference points may also be in the same Coding Tree Unit (CTU) as the coding block.

After affine motion estimation is tried using the four-parameter affine model and the six-parameter affine model, coding prediction costs corresponding to the coding block are calculated from these MVs respectively. An obtained calculation result is represented by cost. In the embodiment of the present disclosure, cost may be equal to a sum of a predicted residual and the number of bits needed for transmission of a group of BVAffi of the coding block. Then, the group of coding parameters corresponding to the minimum cost are selected according to the calculation results and stored. In the first affine motion mode, the first coding parameter corresponding to the coding block includes the value of Affine_Flag, the value of Affine Type_Flag, the value of Merge_Flag, an MVP index, a Motion Vector Difference (MVD) between BVAffi and the MVP, the predicted residual, etc.

In some embodiments, the operation that the candidate list corresponding to the coding block is created includes the following operations.

When the coding mode is the second affine motion mode, the neighbor blocks of the coding block are sequentially accessed according to a second preset sequence to obtain a second candidate set, the second candidate set including at least one neighbor block, and the at least one neighbor block being coded in the first affine motion mode or the second affine motion mode.

A second candidate list corresponding to the second affine motion mode is created based on the second candidate set, a second reference block in the second candidate list being obtained from the second candidate set.

It is to be noted that the first preset sequence represents a sequence of accessing the neighbor blocks in the first affine motion mode, the second preset sequence represents a sequence of accessing the neighbor blocks in the second affine motion mode, and they may be different. In the embodiment of the present disclosure, for example, for the five neighbor blocks illustrated in FIG. 5, the first preset sequence may be the sequence of D→A and C→B→E, and the second preset sequence may be a sequence of A→B→C→D→E.

It is also to be noted that the neighbor block forms the spatial neighboring relationship with the coding block. For the second affine motion mode, still referring to FIG. 5, for the five neighbor blocks A, B, C, D and E illustrated in FIG. 5, the five neighbor blocks are sequentially accessed according to the second preset sequence (for example, the sequence of A→B→C→D→E). When a neighbor block is coded in the first affine motion mode or the second affine motion mode, namely the value of IBCAffine_Flag is true and the value of Affine_Flag is also true, the neighbor block meets the candidate requirement, and MVs of at least two control points of the neighbor block are used as a group of MVPs. Then, the MVs of the at least two control points of the neighbor block are used as a group of MVPs corresponding to the second reference block, to form the second candidate list.

Furthermore, the operation that affine motion estimation is performed on the coding block according to the candidate list corresponding to the coding mode to obtain the coding parameter corresponding to the coding block includes the following operations.

When the coding mode is the second affine motion mode, the second candidate list is traversed to acquire MVPs of at least two control points corresponding to each second reference block in the second candidate list.

MVs of control points at corresponding positions of the coding block are calculated based on the MVPs of the at least two control points corresponding to each second reference block.

A second coding parameter corresponding to the coding block is acquired from the MVs, the second coding parameter representing a group of coding parameters that are obtained in the second affine motion mode for the coding block and have a minimum coding prediction cost.

The operation that predictive coding is performed on the coding block based on the coding parameter corresponding to the coding block includes the following operation.

Predictive coding is performed on the coding block based on the second coding parameter corresponding to the coding block.

It is to be noted that, in the second affine motion mode, the second candidate list is traversed at first to obtain the MVPs of the at least two control points corresponding to each second reference block in the second candidate list. Then, affine motion estimation is tried using the four-parameter affine model or the six-parameter affine model according to the MVPs of the at least two control points corresponding to each second reference block. Specifically, if the four-parameter affine model is used, formula (1) is selected to deduce the MVs of the control points at the corresponding positions of the current coding block. If the six-parameter affine model is used, formula (2) is selected to deduce the MVs of the control points at the corresponding positions of the current coding block. Coding prediction costs corresponding to the coding block are calculated from the obtained MVs respectively, then the minimum value is selected from these coding prediction costs, and the group of coding parameters corresponding to the minimum value may be returned. A calculation result of the coding prediction cost is represented by cost. In the embodiment of the present disclosure, cost may be equal to the sum of the predicted residual and the number of the bits needed for transmission of a group of BVAffi of the coding block. That is, the group of coding parameters corresponding to the minimum cost are selected according to calculation results and stored. In the second affine motion mode, the second coding parameter corresponding to the coding block includes the value of Affine_Flag, the value of Affine Type_Flag, the value of Merge_Flag, the MVP index, the predicted residual, etc.

In summary, the first affine motion mode and the second affine motion mode have the following difference. For the former, affine motion search is performed by taking the MVPs of the at least two control points of the first reference block in the first candidate list as the starting points of search, and then affine motion estimation is performed according to formula (1) or formula (2). For the latter, the MVPs of the at least two control points of the second reference block in the second candidate list may be directly reused to directly perform affine motion estimation according to formula (1) or formula (2).

In some embodiments, after the operation that predictive coding is performed on the coding block based on the coding parameter corresponding to the coding block, the method further includes the following operation.

A bitstream corresponding to the coding block is sent, the bitstream at least including a group of coding parameters that are obtained by non-translation motion estimation in the coding mode for the coding block and have a minimum coding prediction cost, and the coding parameter at least including the value of Merge_Flag.

It is to be noted that, after predictive coding is performed on the coding block, the encoder further sends the bitstream corresponding to the coding block to the decoder. Specifically, for the first affine motion mode, on the encoder side, the encoder merely has to write the first coding parameter obtained in the coding mode (such as the value of Affine_Flag, the value of Affine Type_Flag, the value of Merge_Flag, the MVP index, the MVD, and the predicted residual) to the bitstream and then send the bitstream to the decoder. Here, the MVP index refers to indexes of a group of MVPs finally selected for the coding block in the first candidate list. For the second affine motion mode, on the encoder side, the encoder merely has to write the second coding parameter obtained in the coding mode (such as the value of Affine_Flag, the value of Affine Type_Flag, the value of Merge_Flag, the MVP index, and the predicted residual) to the bitstream and then send the bitstream to the decoder. Here, the MVP index refers to indexes of a group of MVPs finally selected for the coding block in the second candidate list. Here, a reconstructed sample value corresponding to each sample in the coding block may subsequently be obtained on a decoder side according to the bitstream sent by the encoder.

The embodiment provides the prediction method. The method is applied to the encoder. For the coding mode used for the coding block in the original picture, the candidate list corresponding to the coding mode is created. The coding mode includes the first affine motion mode or the second affine motion mode. The reference block in the candidate list is spatially neighboring to the coding block. The reference block is coded in the first affine motion mode or the second affine motion mode. Affine motion estimation is performed on the coding block according to the candidate list corresponding to the coding mode to obtain the coding parameter corresponding to the coding block. Predictive coding is performed on the coding block based on the coding parameter corresponding to the coding block. As such, in the embodiment of the present disclosure, since affine motion estimation is added, complex non-translation motion conditions, such as scaling, rotation and transformation, of the coding block of the intra prediction type in the screen image may be eliminated, the number of coded bits is reduced, and a coding rate is further improved.

Second Embodiment

Figure 6:
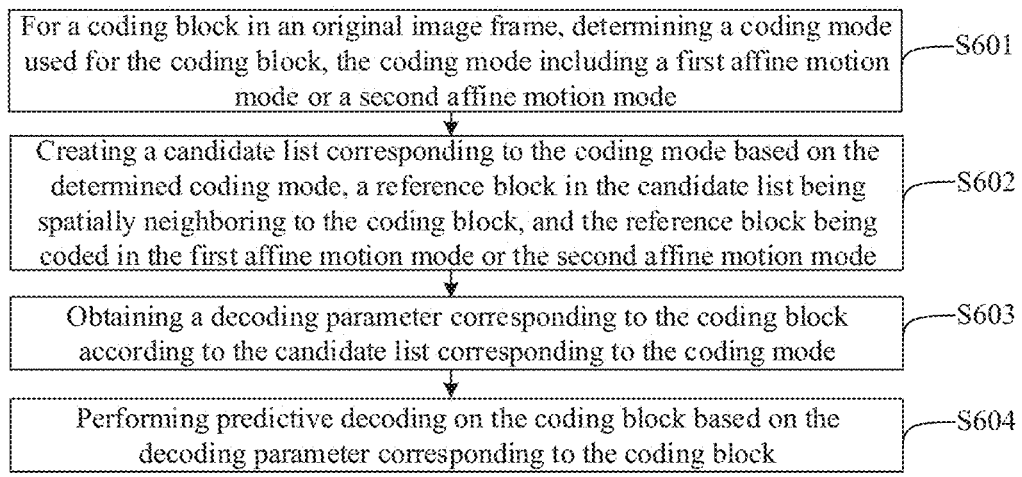
FIG. 6 is a flowchart of another prediction method according to an embodiment of the present disclosure.

Referring to FIG. 6, a flow example of another prediction method according to an embodiment of the present disclosure is illustrated. The method is applied to a decoder. The method may include the following operations.

In S601, for a coding block in an original picture, a coding mode used for the coding block is determined, the coding mode including a first affine motion mode or a second affine motion mode.

In S602, a candidate list corresponding to the coding mode is created based on the determined coding mode, a reference block in the candidate list being spatially neighboring to the coding block, and the reference block being coded in the first affine motion mode or the second affine motion mode.

In S603, a decoding parameter corresponding to the coding block is obtained according to the candidate list corresponding to the coding mode.

In S604, predictive decoding is performed on the coding block based on the decoding parameter corresponding to the coding block.

It is to be noted that, for the coding block in the original picture, on a decoder side, the coding mode used for the coding block is determined at first. The coding mode includes the first affine motion mode or the second affine motion mode. Then, the candidate list corresponding to the coding mode is created according to the determined coding mode. The reference block in the candidate list is spatially neighboring to the coding block. The reference block is coded in the first affine motion mode or the second affine motion mode. Next, the decoding parameter corresponding to the coding block is obtained according to the candidate list corresponding to the coding mode. Finally, predictive decoding is performed on the coding block based on the decoding parameter corresponding to the coding block. In the embodiment of the present disclosure, since affine motion estimation is added, complex non-translation motion conditions, such as scaling, rotation and transformation, of the coding block of the intra prediction type in the screen image may be eliminated, the number of coded bits is reduced, and a coding rate is further improved.

It is also to be noted that, after predictive coding is performed on the coding block, an encoder may send a bitstream corresponding to the coding block to the decoder. A value of Merge_Flag in the bitstream is configured to distinguish the coding mode used for the coding block. The coding parameter in the bitstream is configured to represent a group of coding parameters that are obtained by non-translation motion estimation in the coding mode for the coding block and have a minimum coding prediction cost.

As such, on the decoder side, the decoding parameter may be determined by the coding parameter in the bitstream and the candidate list. Since the coding parameter represents the group of coding parameters that are obtained by non-translation motion estimation in the coding mode for the coding block and have the minimum coding prediction cost, the decoding parameter obtained according to the coding parameter and the candidate list also represents a group of decoding parameters that are obtained by non-translation motion estimation in the coding mode for the coding block and have the minimum coding prediction cost.

In some embodiments, before the operation that the coding mode used for the coding block is determined, the method further includes the following operation.

A bitstream corresponding to the coding block is received, the bitstream at least including a group of coding parameters that are obtained by non-translation motion estimation in the coding mode for the coding block and have a minimum coding prediction cost, and the coding parameter at least including a value of Merge_Flag.

Furthermore, before the operation that the coding mode used for the coding block is determined, the method further includes the following operations.

After the bitstream corresponding to the coding block is received, whether the original picture is a reference frame corresponding to the coding block is determined.

When the original picture is the reference frame corresponding to the coding block, it is determined that intra predictive coding is performed on the coding block in the first affine motion mode or the second affine motion mode.

When the original picture is not the reference frame corresponding to the coding block, it is determined that inter predictive coding is used for the coding block.

Furthermore, the operation that the coding mode used for the coding block is determined includes the following operations.

When the reference frame corresponding to the coding block is the original picture and the value of Merge_Flag is a first value, it is determined that the coding mode used for the coding block is the first affine motion mode.

When the reference frame corresponding to the coding block is the original picture and the value of Merge_Flag is a second value, it is determined that the coding mode used for the coding block is the second affine motion mode, the first value being different from the second value.

It is to be noted that the first value may be represented by a number, a letter, or a combination of letters, the second value may also be represented by a number, a letter or a combination of letters, but the first value is different from the second value. The first value may be 1, and the second value may be 0. Alternatively, the first value may be true, and the second value may be false. However, no specific limits are made in the embodiment of the present disclosure.

It is also to be noted that, after the decoder receives the bitstream, the coding parameter in the bitstream includes Merge_Flag, and also reuses two flags (represented by Affine_Flag and Affine Type_Flag) for an inter affine motion mode. If a value of Affine_Flag is the first value, it indicates that an affine motion model is used for the coding block. In such case, whether the original picture is the reference frame corresponding to the coding block is further to be determined. If a determination result is YES, it is determined that the coding mode for the coding block is the first affine motion mode or the second affine motion mode. If the determination result is NO, it is determined that inter predictive coding is used for the coding block. For example, the coding mode may be an existing inter affine motion mode in a related technical solution. The value of Merge_Flag may be determined to distinguish the first affine motion mode from the second affine motion mode. Specifically, when the value of Merge_Flag is the first value, it is determined that the coding mode used for the coding block is the first affine motion mode, and when the value of Merge_Flag is the second value, it is determined that the coding mode used for the coding block is the second affine motion mode. In addition, a value of Affine Type_Flag may be determined to distinguish the affine model used for the coding block. Specifically, when the value of Affine Type_Flag is set to the first value, it indicates that the affine model used for the coding block is a six-parameter affine model, and when the value of Affine Type_Flag is set to the second value, it indicates that the affine model used for the coding block is a four-parameter affine model. Here, the first value may be 1 or true, and the second value may be 0 or false.

In some embodiments, the operation that the candidate list corresponding to the coding block is created based on the determined coding mode includes the following operations.

When the coding mode is the first affine motion mode, neighbor blocks of the coding block are sequentially accessed according to a first preset sequence to obtain a first candidate set, the first candidate set including two neighbor blocks, and the two neighbor blocks being coded in the first affine motion mode or the second affine motion mode.

A first candidate list corresponding to the first affine motion mode is created based on the first candidate set, a first reference block in the first candidate list being obtained from the first candidate set.

Furthermore, the operation that the decoding parameter corresponding to the coding block is obtained according to the candidate list corresponding to the coding mode includes the following operations.

When the coding mode is the first affine motion mode, after the bitstream corresponding to the coding block is received, a first coding parameter corresponding to the coding block is acquired from the bitstream, the first coding parameter representing a group of coding parameters that are obtained by non-translation motion estimation in the first affine motion mode for the coding block and have a minimum coding prediction cost.

A first decoding parameter corresponding to the coding block is obtained based on the first candidate list and the first coding parameter.

The operation that predictive decoding is performed on the coding block based on the decoding parameter corresponding to the coding block includes the following operation.

Predictive decoding is performed on the coding block based on the first decoding parameter corresponding to the coding block.

It is to be noted that, for the first affine motion mode, the corresponding first candidate list may be created on the decoder side according to a method for creating a first candidate list on the encoder side. In the first affine motion mode, the first coding parameter corresponding to the coding block includes the value of Affine_Flag, the value of Affine Type_Flag, the value of Merge_Flag, an MVP index, an MVD, a predicted residual, etc. Therefore, BVAffi of the coding block may be obtained in combination with the first candidate list according to the MVP index and MVD in the bitstream, a sample predictor corresponding to each sample in the coding block may be obtained according to BVAffi, and then the predicted residual in the bitstream may be added to obtain a reconstructed sample value corresponding to each sample in the coding block. As such, decoding processing of the coding block is implemented.

In some embodiments, the operation that the candidate list corresponding to the coding block is created based on the determined coding mode includes the following operations.

When the coding mode is the second affine motion mode, the neighbor blocks of the coding block are sequentially accessed according to a second preset sequence to obtain a second candidate set, the second candidate set including at least one neighbor block, and the at least one neighbor block being coded in the first affine motion mode or the second affine motion mode.

A second candidate list corresponding to the second affine motion mode is created based on the second candidate set, a second reference block in the second candidate list being obtained from the second candidate set.

Furthermore, the operation that the decoding parameter corresponding to the coding block is obtained according to the candidate list corresponding to the coding mode includes the following operations.

When the coding mode is the second affine motion mode, after the bitstream corresponding to the coding block is received, a second coding parameter corresponding to the coding block is acquired from the bitstream, the second coding parameter representing a group of coding parameters that are obtained by non-translation motion estimation in the second affine motion mode for the coding block and have a minimum coding prediction cost.

A second decoding parameter corresponding to the coding block is obtained based on the second candidate list and the second coding parameter.

The operation that predictive decoding is performed on the coding block based on the decoding parameter corresponding to the coding block includes the following operation.

Predictive decoding is performed on the coding block based on the second decoding parameter corresponding to the coding block.

It is to be noted that, for the second affine motion mode, the corresponding second candidate list may also be created on the decoder side according to a method for creating a second candidate list on the encoder side. In the second affine motion mode, a coding parameter of the neighbor block is directly reused for the coding block, and thus there is no need to transmit the MVD. The second coding parameter corresponding to the coding block includes the value of Affine_Flag, the value of Affine Type_Flag, the value of Merge_Flag, the MVP index, the predicted residual, etc. Therefore, BVAffi of the coding block may be obtained directly in combination with the second candidate list according to the MVP index in the bitstream, a sample predictor corresponding to each sample in the coding block may be obtained according to BVAffi, and then the predicted residual in the bitstream may be added to obtain a reconstructed sample value corresponding to each sample in the coding block. As such, decoding processing of the coding block is also implemented.

The embodiment provides the prediction method. The method is applied to the decoder. For the coding block in the original picture, the coding mode used for the coding block is determined. The coding mode includes the first affine motion mode or the second affine motion mode. The candidate list corresponding to the coding mode is created according to the determined coding mode. The reference block in the candidate list is spatially neighboring to the coding block. The reference block is coded in the first affine motion mode or the second affine motion mode. The decoding parameter corresponding to the coding block is obtained according to the candidate list corresponding to the coding mode. Predictive decoding is performed on the coding block based on the decoding parameter corresponding to the coding block. In the embodiment of the present disclosure, since affine motion estimation is added, complex non-translation motion conditions, such as scaling, rotation and transformation, of the coding block of the intra prediction type in the screen image may be eliminated, the number of coded bits is reduced, and a coding rate is further improved.

Third Embodiment

Figure 7:
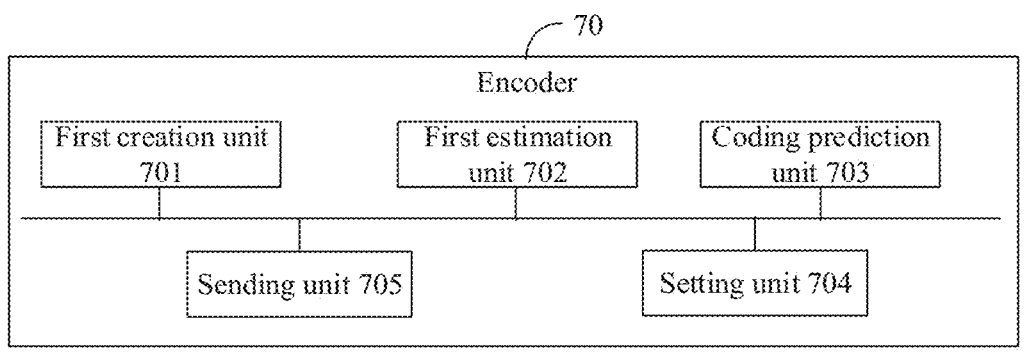
FIG. 7 is a composition structure diagram of an encoder according to an embodiment of the present disclosure.

Based on the same inventive concept of the first embodiment, referring to FIG. 7, a composition structure of an encoder 70 according to an embodiment of the present disclosure is illustrated, which may include a first creation unit 701, a first estimation unit 702 and a coding prediction unit 703.

The first creation unit 701 is configured to, for a coding mode used for a coding block in an original picture, create a candidate list corresponding to the coding mode, the coding mode including a first affine motion mode or a second affine motion mode, a reference block in the candidate list being spatially neighboring to the coding block, and the reference block being coded in the first affine motion mode or the second affine motion mode.

The first estimation unit 702 is configured to perform affine motion estimation on the coding block according to the candidate list corresponding to the coding mode to obtain a coding parameter corresponding to the coding block.

The coding prediction unit 703 is configured to perform predictive coding on the coding block based on the coding parameter corresponding to the coding block.

In the solution, referring to FIG. 7, the encoder 70 further includes a setting unit 704, configured to set the original picture as a reference frame corresponding to the coding block to perform intra predictive coding on the coding block in the first affine motion mode or the second affine motion mode.

In the solution, the setting unit 704 is further configured to, when the reference frame corresponding to the coding block is the original picture and the coding block is coded by IBCAffine, determine that the coding mode used for the coding block is the first affine motion mode and set a value of Merge_Flag of the coding block to a first value, and when the reference frame corresponding to the coding block is the original picture and the coding block is coded by IBCAffine-Merge, determine that the coding mode used for the coding block is the second affine motion mode and set the value of Merge_Flag of the coding block to a second value, the first value being different from the second value.

In the solution, the first creation unit 701 is specifically configured to, when the coding mode is the first affine motion mode, sequentially access neighbor blocks of the coding block according to a first preset sequence to obtain a first candidate set, the first candidate set including two neighbor blocks, and the two neighbor blocks being coded in the first affine motion mode or the second affine motion mode, and create a first candidate list corresponding to the first affine motion mode based on the first candidate set, a first reference block in the first candidate list being obtained from the first candidate set.

In the solution, the first estimation unit 702 is specifically configured to, when the coding mode is the first affine motion mode, traverse the first candidate list to acquire MVPs of at least two control points corresponding to each first reference block in the first candidate list, perform affine motion estimation calculation on the coding block by taking the MVPs of the at least two control points corresponding to each first reference block as starting points of affine search to obtain MVs of control points at corresponding positions of the coding block, and acquire a first coding parameter corresponding to the coding block from the MVs, the first coding parameter representing a group of coding parameters that are obtained in the first affine motion mode for the coding block and have a minimum coding prediction cost.

The coding prediction unit 703 is specifically configured to perform predictive coding on the coding block based on the first coding parameter corresponding to the coding block.

In the solution, the first estimation unit 702 is specifically configured to calculate a predictor of at least one sample of the coding block in the corresponding reference frame based on the MVPs of the at least two control points corresponding to each first reference block, perform an iterative operation on a matching error of the at least one sample of the coding block between the original picture and the reference frame and a gradient matrix of the predictor, update the MVs according to the iterative operation, when a count of the iterative operation meets a preset count threshold, obtain updated MVs, and determine the updated MVs as the MVs of the control points at the corresponding positions of the coding block.

In the solution, the first creation unit 701 is specifically configured to, when the coding mode is the second affine motion mode, sequentially access the neighbor blocks of the coding block according to a second preset sequence to obtain a second candidate set, the second candidate set including at least one neighbor block, and the at least one neighbor block being coded in the first affine motion mode or the second affine motion mode, and create a second candidate list corresponding to the second affine motion mode based on the second candidate set, a second reference block in the second candidate list being obtained from the second candidate set.

In the solution, the first estimation unit 702 is specifically configured to, when the coding mode is the second affine motion mode, traverse the second candidate list to acquire MVPs of at least two control points corresponding to each second reference block in the second candidate list, calculate MVs of control points at corresponding positions of the coding block based on the MVPs of the at least two control points corresponding to each second reference block, and acquire a second coding parameter corresponding to the coding block from the MVs, the second coding parameter representing a group of coding parameters that are obtained in the second affine motion mode for the coding block and have a minimum coding prediction cost.

The coding prediction unit 703 is specifically configured to perform predictive coding on the coding block based on the second coding parameter corresponding to the coding block.

In the solution, referring to FIG. 7, the encoder 70 further includes a sending unit 705, configured to send a bitstream corresponding to the coding block, the bitstream at least including a group of coding parameters that are obtained by non-translation motion estimation in the coding mode for the coding block and have a minimum coding prediction cost, and the coding parameter at least including the value of Merge_Flag.

It can be understood that, in the embodiment, "unit" may be part of a circuit, part of a processor, part of a program or software and the like, of course, may also be modular and may also be non-modular. In addition, each component in the embodiment may be integrated into a processing unit, each unit may also exist independently, and two or more than two units may also be integrated into a unit. The integrated unit may be implemented in a hardware form and may also be implemented in form of software function module.

When implemented in form of software function module and sold or used not as an independent product, the integrated unit may be stored in a computer-readable storage medium. Based on such an understanding, the technical solution of the embodiment substantially or parts making contributions to the related art or all or part of the technical solution may be embodied in form of software product, and the computer software product is stored in a storage medium, including a plurality of instructions configured to enable a computer device (which may be a personal computer, a server, a network device, etc.) or a processor to execute all or part of the steps of the method in the embodiment. The storage medium includes various media capable of storing program codes such as a U disk, a mobile hard disk, a Read Only Memory (ROM), a Random Access Memory (RAM), a magnetic disk, or an optical disk.

The embodiment provides a computer storage medium, which stores a prediction program. The prediction program is executed by a first processor to implement the steps of any method as described in the first embodiment.

Figure 8:
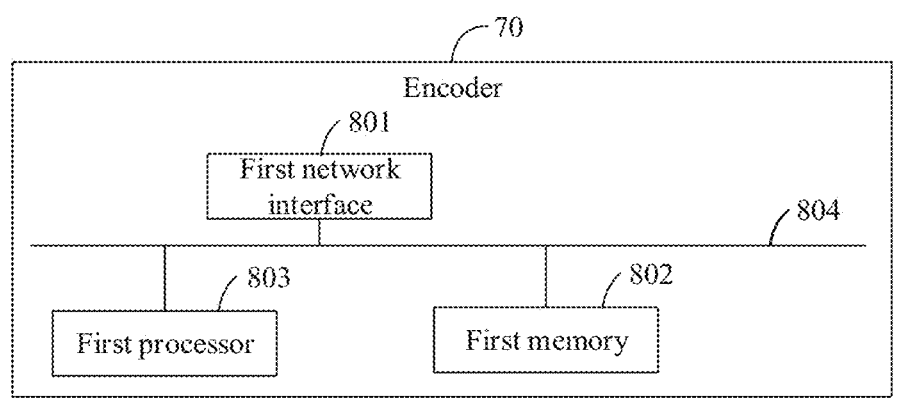
FIG. 8 is a specific hardware structure diagram of an encoder according to an embodiment of the present disclosure.

Based on the composition of the encoder 70 and the computer storage medium, referring to FIG. 8, a specific hardware structure of the encoder 70 according to the embodiment of the present disclosure is illustrated, and may include a first network interface 801, a first memory 802 and a first processor 803. Each component is coupled together through a first bus system 804. It can be understood that the first bus system 804 is configured to implement connection communication between these components. The first bus system 804 includes a data bus and also includes a power bus, a control bus and a state signal bus. However, for clear description, various buses in FIG. 8 are marked as the first bus system 804.

The first network interface 801 is configured to receive and send a signal in a process of receiving and sending information with another external network element.

The first memory 802 is configured to store a computer program capable of running in the first processor 803.

The first processor 803 is configured to run the computer program to execute:

for a coding mode used for a coding block in an original picture, creating a candidate list corresponding to the coding mode, the coding mode including a first affine motion mode or a second affine motion mode, a reference block in the candidate list being spatially neighboring to the coding block, and the reference block being coded in the first affine motion mode or the second affine motion mode;

performing affine motion estimation on the coding block according to the candidate list corresponding to the coding mode to obtain a coding parameter corresponding to the coding block; and performing predictive coding on the coding block based on the coding parameter corresponding to the coding block.

It can be understood that the first memory 802 in the embodiment of the present disclosure may be a volatile memory or a nonvolatile memory, or may include both the volatile and nonvolatile memories. The nonvolatile memory may be a ROM, a Programmable ROM (PROM), an Erasable PROM (EPROM), an Electrically EPROM (EEPROM), or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DRRAM). It is to be noted that the first memory 802 of a system and method described in the disclosure is intended to include, but not limited to, memories of these and any other proper types.

The first processor 803 may be an integrated circuit chip with a signal processing capability. In an implementation process, each step of the method may be completed by an integrated logic circuit of hardware in the first processor 803 or an instruction in a software form. The first processor 803 may be a universal processor, a Digital Signal Processor (DSP), an Application Specific Integrated Circuit (ASIC), a Field Programmable Gate Array (FPGA) or another Programmable Logic Device (PLD), a discrete gate or transistor logical device, and a discrete hardware component. Each method, step and logical block diagram disclosed in the embodiments of the present disclosure may be implemented or executed. The universal processor may be a microprocessor or the processor may also be any conventional processor, etc. The steps of the method disclosed in combination with the embodiments of the present disclosure may be directly embodied to be executed and completed by a hardware decoding processor or executed and completed by a combination of hardware and software modules in the decoding processor. The software module may be located in a mature storage medium in this field such as a RAM, a flash memory, a ROM, a PROM or EEPROM, and a register. The storage medium is in the first memory 802. The first processor 803 reads information in the first memory 802 and completes the steps of any method as described in the first embodiment in combination with hardware.

It can be understood that these embodiments described herein may be implemented by hardware, software, firmware, middleware, a microcode or a combination thereof. In case of implementation with the hardware, the processing unit may be implemented in one or more ASICs, DSPs, DSP Devices (DSPDs), PLDs, FPGAs, universal processors, controllers, microcontrollers, microprocessors, other electronic units configured to execute the functions in the present disclosure or combinations thereof.

In case of implementation with the software, the technology described herein may be implemented through the modules (for example, processes and functions) executing the functions described herein. A software code may be stored in the memory and executed by the processor. The memory may be implemented in the processor or outside the processor.

Alternatively, as another embodiment, the first processor 803 is further configured to run the computer program to execute the steps of any method as described in the first embodiment.

Fourth Embodiment

Figure 9:
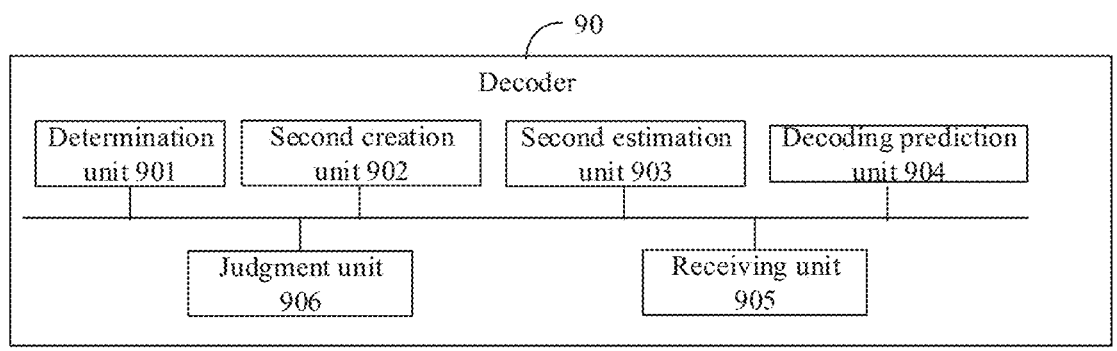
FIG. 9 is a composition structure diagram of a decoder according to an embodiment of the present disclosure.

Based on the same inventive concept of the second embodiment, referring to FIG. 9, a composition structure of a decoder 90 according to an embodiment of the present disclosure is illustrated, which may include a determination unit 901, a second creation unit 902, a second estimation unit 903 and a decoding prediction unit 904.

The determination unit 901 is configured to, for a coding block in an original picture, determine a coding mode used for the coding block, the coding mode including a first affine motion mode or a second affine motion mode.

The second creation unit 902 is configured to create a candidate list corresponding to the coding mode based on the determined coding mode, a reference block in the candidate list being spatially neighboring to the coding block, and the reference block being coded in the first affine motion mode or the second affine motion mode.

The second estimation unit 903 is configured to obtain a decoding parameter corresponding to the coding block according to the candidate list corresponding to the coding mode.

The decoding prediction unit 904 is configured to perform predictive decoding on the coding block based on the decoding parameter corresponding to the coding block.

In the solution, referring to FIG. 9, the decoder 90 further includes a receiving unit 905, configured to receive a bitstream corresponding to the coding block, the bitstream at least including a group of coding parameters that are obtained by non-translation motion estimation in the coding mode for the coding block and have a minimum coding prediction cost, and the coding parameter at least including a value of Merge_Flag.

In the solution, referring to FIG. 9, the decoder 90 further includes a judgment unit 906, configured to, after the bitstream corresponding to the coding block is received, determine whether the original picture is a reference frame corresponding to the coding block.

The determination unit 901 is further configured to, when the original picture is the reference frame corresponding to the coding block, determine to perform intra predictive coding on the coding block in the first affine motion mode or the second affine motion mode, and when the original picture is not the reference frame corresponding to the coding block, determine to perform inter predictive coding on the coding block.

In the solution, the determination unit 901 is specifically configured to, when the reference frame corresponding to the coding block is the original picture and the value of Merge_Flag is a first value, determine that the coding mode used for the coding block is the first affine motion mode, and when the reference frame corresponding to the coding block is the original picture and the value of Merge_Flag is a second value, determine that the coding mode used for the coding block is the second affine motion mode, the first value being different from the second value.

In the solution, the second creation unit 902 is specifically configured to, when the coding mode is the first affine motion mode, sequentially access neighbor blocks of the coding block according to a first preset sequence to obtain a first candidate set, the first candidate set including two neighbor blocks, and the two neighbor blocks being coded in the first affine motion mode or the second affine motion mode, and create a first candidate list corresponding to the first affine motion mode based on the first candidate set, a first reference block in the first candidate list being obtained from the first candidate set.

In the solution, the second estimation unit 903 is specifically configured to, when the coding mode is the first affine motion mode, after the bitstream corresponding to the coding block is received, acquire a first coding parameter corresponding to the coding block from the bitstream, the first coding parameter representing a group of coding parameters that are obtained by non-translation motion estimation in the first affine motion mode for the coding block and have a minimum coding prediction cost, and obtain a first decoding parameter corresponding to the coding block based on the first candidate list and the first coding parameter.

The decoding prediction unit 904 is specifically configured to perform predictive decoding on the coding block based on the first decoding parameter corresponding to the coding block.

In the solution, the second creation unit 902 is specifically configured to, when the coding mode is the second affine motion mode, sequentially access the neighbor blocks of the coding block according to a second preset sequence to obtain a second candidate set, the second candidate set including at least one neighbor block, and the at least one neighbor block being coded in the first affine motion mode or the second affine motion mode, and create a second candidate list corresponding to the second affine motion mode based on the second candidate set, a second reference block in the second candidate list being obtained from the second candidate set.

In the solution, the second estimation unit 903 is specifically configured to, when the coding mode is the second affine motion mode, after the bitstream corresponding to the coding block is received, acquire a second coding parameter corresponding to the coding block from the bitstream, the second coding parameter representing a group of coding parameters that are obtained by non-translation motion estimation in the second affine motion mode for the coding block and have a minimum coding prediction cost, and obtain a second decoding parameter corresponding to the coding block based on the second candidate list and the second coding parameter.

The decoding prediction unit 904 is specifically configured to perform predictive decoding on the coding block based on the second decoding parameter corresponding to the coding block.

The embodiment provides a computer storage medium, which stores a prediction program. The prediction program is executed by a second processor to implement the steps of any method as described in the second embodiment.

Figure 10:
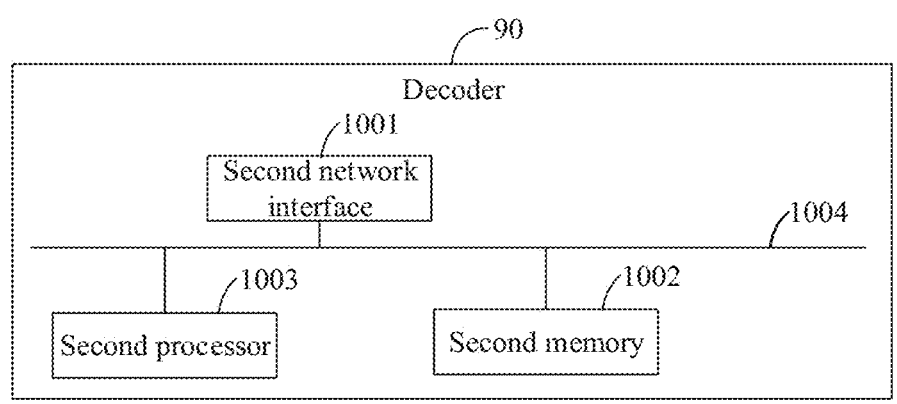
FIG. 10 is a specific hardware structure diagram of a decoder according to an embodiment of the present disclosure.

Based on the composition of the decoder 90 and the computer storage medium, referring to FIG. 10, a specific hardware structure of the decoder 90 according to the embodiment of the present disclosure is illustrated, and may include a second network interface 1001, a second memory 1002 and a second processor 1003. Each component is coupled together through a second bus system 1004. It can be understood that the second bus system 1004 is configured to implement connection communication between these components. The second bus system 1004 includes a data bus and also includes a power bus, a control bus and a state signal bus. However, for clear description, various buses in FIG. 10 are marked as the second bus system 1004.

The second network interface 1001 is configured to receive and send a signal in a process of receiving and sending information with another external network element.

The second memory 1002 is configured to store a computer program capable of running in the second processor 1003.

The second processor 1003 is configured to run the computer program to execute:

for a coding block in an original picture, determining a coding mode used for the coding block, the coding mode including a first affine motion mode or a second affine motion mode;

creating a candidate list corresponding to the coding mode based on the determined coding mode, a reference block in the candidate list being spatially neighboring to the coding block, and the reference block being coded in the first affine motion mode or the second affine motion mode;

obtaining a decoding parameter corresponding to the coding block according to the candidate list corresponding to the coding mode; and performing predictive decoding on the coding block based on the decoding parameter corresponding to the coding block.

Alternatively, as another embodiment, the second processor 1003 is further configured to run the computer program to execute the steps of any method as described in the second embodiment.

It can be understood that the second memory 1002 has a hardware function similar to that of the first memory 802 and the second processor 1003 has a hardware function similar to that of the first processor 803. Elaborations are omitted herein.

It is to be noted that the technical solutions recorded in the embodiments of the present disclosure may be freely combined without conflicts.

The above is only the specific implementation mode of the present disclosure and not intended to limit the scope of protection of the present disclosure. Any variations or replacements apparent to those skilled in the art within the technical scope disclosed by the present disclosure shall fall within the scope of protection of the present disclosure. Therefore, the scope of protection of the present disclosure shall be subject to the scope of protection of the claims.

INDUSTRIAL APPLICABILITY

In the embodiments of the present disclosure. On the encoder side, the encoder creates the candidate list corresponding to the coding mode for the coding mode used for the coding block in the original picture, the coding mode including the first affine motion mode or the second affine motion mode, the reference block in the candidate list being spatially neighboring to the coding block, and the reference block is coded in the first affine motion mode or the second affine motion mode, performs affine motion estimation on the coding block according to the candidate list corresponding to the coding mode to obtain the coding parameter corresponding to the coding block, and performs predictive coding on the coding block based on the coding parameter corresponding to the coding block. On a decoder side, the decoder determines the coding mode used for the coding block, the coding mode including the first affine motion mode or the second affine motion mode, creates the candidate list corresponding to the coding mode based on the determined coding mode, the reference block in the candidate list being spatially neighboring to the coding block, and the reference block being coded in the first affine motion mode or the second affine motion mode, obtains the decoding parameter corresponding to the coding block according to the candidate list corresponding to the coding mode, and performs predictive decoding on the coding block based on the decoding parameter corresponding to the coding block. Since affine motion estimation is added to the encoder side, non-translation motions, such as scaling, rotation and transformation, of a coding block of an intra prediction type in a screen image may be eliminated, the number of coded bits is reduced, and a coding rate is further improved.

The invention claimed is:

1. A prediction method, applied to an encoder, and the method comprising:
   for a coding mode used for a coding block in an original picture, creating a candidate list corresponding to the coding mode, the coding mode comprising a first affine motion mode or a second affine motion mode, a reference block in the candidate list being spatially neighboring to the coding block, and the reference block being coded in the first affine motion mode or the second affine motion mode;
   performing affine motion estimation on the coding block according to the candidate list corresponding to the coding mode, to obtain a coding parameter corresponding to the coding block; and
   performing predictive coding on the coding block based on the coding parameter corresponding to the coding block,
   wherein creating the candidate list corresponding to the coding mode comprises:
   when the coding mode is the first affine motion mode, sequentially accessing neighbor blocks of the coding block according to a first preset sequence to obtain a first candidate set, the first candidate set comprising two neighbor blocks, and the two neighbor blocks being coded in the first affine motion mode or the second affine motion mode; and
   creating a first candidate list corresponding to the first affine motion mode based on the first candidate set, a first reference block in the first candidate list being obtained from the first candidate set
   wherein performing affine motion estimation on the coding block according to the candidate list corresponding to the coding mode to obtain the coding parameter corresponding to the coding block comprises:
   when the coding mode is the first affine motion mode, traversing the first candidate list to acquire Motion Vector Predictors (MVPs) of at least two control points corresponding to each first reference block in the first candidate list,
   performing affine motion estimation calculation on the coding block by taking the MVPs of the at least two control points corresponding to each first reference block as starting points of affine search to obtain Motion Vectors (MVs) of control points at corresponding positions of the coding block, and
   acquiring a first coding parameter corresponding to the coding block from the MVs, the first coding parameter representing a group of coding parameters that are obtained in the first affine motion mode for the coding block and have a minimum coding prediction cost; and
   wherein performing predictive coding on the coding block based on the coding parameter corresponding to the coding block comprises:
   performing predictive coding on the coding block based on the first coding parameter corresponding to the coding block,
   wherein performing affine motion estimation calculation on the coding block by taking the MVPs of the at least two control points corresponding to each first reference block as the starting points of affine search to obtain the MVs of the control points at the corresponding positions of the coding block comprises:
   calculating a predictor of at least one sample of the coding block in the corresponding reference frame based on the MVPs of the at least two control points corresponding to each first reference block;
   performing an iterative operation on a matching error of the at least one sample of the coding block between the original picture and the reference frame and a gradient matrix of the predictor, and updating the MVs according to the iterative operation;
   when a count of the iterative operation meets a preset count threshold, obtaining updated MVs; and
   determining the updated MVs as the MVs of the control points at the corresponding positions of the coding block.

2. The method of claim 1, after performing predictive coding on the coding block based on the coding parameter corresponding to the coding block, the method further comprising:
   sending a bitstream corresponding to the coding block, the bitstream at least comprising a group of coding parameters that are obtained by non-translation motion estimation in the coding mode for the coding block and have a minimum coding prediction cost, and the coding parameter at least comprising the value of Merge_Flag.

3. The method of claim 1, before creating the candidate list corresponding to the coding mode for the coding mode used for the coding block in the original picture, the method further comprising:
setting the original picture as a reference frame corresponding to the coding block, to perform intra predictive coding on the coding block in the first affine motion mode or the second affine motion mode.

4. The method of claim 3, before creating the candidate list corresponding to the coding mode for the coding mode used for the coding block in the original picture, further comprising:
when the reference frame corresponding to the coding block is the original picture and the coding block is coded by Intra Block Copy (IBC) with Affine (IBCAffine), determining that the coding mode used for the coding block is the first affine motion mode, and setting a value of a merge flag Merge_Flag of the coding block to a first value; and
when the reference frame corresponding to the coding block is the original picture and the coding block is coded by IBC with Affine Merge (IBCAffineMerge), determining that the coding mode used for the coding block is the second affine motion mode, and setting the value of the merge flag Merge_Flag of the coding block to a second value, the first value being different from the second value.

5. The method of claim 1, wherein creating the candidate list corresponding to the coding mode comprises:
when the coding mode is the second affine motion mode, sequentially accessing the neighbor blocks of the coding block according to a second preset sequence to obtain a second candidate set, the second candidate set comprising at least one neighbor block, and the at least one neighbor block being coded in the first affine motion mode or the second affine motion mode; and
creating a second candidate list corresponding to the second affine motion mode based on the second candidate set, a second reference block in the second candidate list being obtained from the second candidate set.

6. The method of claim 5, wherein performing affine motion estimation on the coding block according to the candidate list corresponding to the coding mode to obtain the coding parameter corresponding to the coding block comprises:
when the coding mode is the second affine motion mode, traversing the second candidate list to acquire MVPs of at least two control points corresponding to each second reference block in the second candidate list,
calculating MVs of control points at corresponding positions of the coding block based on the MVPs of the at least two control points corresponding to each second reference block, and
acquiring a second coding parameter corresponding to the coding block from the MVs, the second coding parameter representing a group of coding parameters that are obtained in the second affine motion mode for the coding block and have a minimum coding prediction cost; and
performing predictive coding on the coding block based on the coding parameter corresponding to the coding block comprises:
performing predictive coding on the coding block based on the second coding parameter corresponding to the coding block.

7. An encoder, comprising a memory and a processor, wherein
the memory is configured to store a computer program capable of running in the processor; and
the processor is configured to run the computer program to:
for a coding mode used for a coding block in an original picture, create a candidate list corresponding to the coding mode, the coding mode comprising a first affine motion mode or a second affine motion mode, a reference block in the candidate list being spatially neighboring to the coding block, and the reference block being coded in the first affine motion mode or the second affine motion mode;
perform affine motion estimation on the coding block according to the candidate list corresponding to the coding mode to obtain a coding parameter corresponding to the coding block; and
perform predictive coding on the coding block based on the coding parameter corresponding to the coding block,
wherein the processor is configured to, when the coding mode is the first affine motion mode, sequentially access neighbor blocks of the coding block according to a first preset sequence to obtain a first candidate set, the first candidate set comprising two neighbor blocks, and the two neighbor blocks being coded in the first affine motion mode or the second affine motion mode, and create a first candidate list corresponding to the first affine motion mode based on the first candidate set, a first reference block in the first candidate list being obtained from the first candidate set,
wherein the processor is configured to, when the coding mode is the first affine motion mode, traverse the first candidate list to acquire Motion Vector Predictors (MVPs) of at least two control points corresponding to each first reference block in the first candidate list, perform affine motion estimation calculation on the coding block by taking the MVPs of the at least two control points corresponding to each first reference block as starting points of affine search to obtain Motion Vectors (MVs) of control points at corresponding positions of the coding block, and acquire a first coding parameter corresponding to the coding block from the MVs, the first coding parameter representing a group of coding parameters that are obtained in the first affine motion mode for the coding block and have a minimum coding prediction cost; and
wherein the processor is configured to perform predictive coding on the coding block based on the first coding parameter corresponding to the coding block,
wherein the processor is configured to calculate a predictor of at least one sample of the coding block in the corresponding reference frame based on the MVPs of the at least two control points corresponding to each first reference block, perform an iterative operation on a matching error of the at least one sample of the coding block between the original picture and the reference frame and a gradient matrix of the predictor, update the MVs according to the iterative operation, when a count of the iterative operation meets a preset count threshold, obtain updated MVs, and determine the updated MVs as the MVs of the control points at the corresponding positions of the coding block.

8. The encoder of claim 7, further comprising a network interface, configured to send a bitstream corresponding to the coding block, the bitstream at least comprising a group of coding parameters that are obtained by non-translation motion estimation in the coding mode for the coding block and have a minimum coding prediction cost, and the coding parameter at least comprising the value of Merge_Flag.

9. The encoder of claim 7, further comprising a network interface, configured to set the original picture as a reference frame corresponding to the coding block to perform intra predictive coding on the coding block in the first affine motion mode or the second affine motion mode.

10. The encoder of claim 9, wherein the network interface is further configured to, when the reference frame corresponding to the coding block is the original picture and the coding block is coded by Intra Block Copy (IBC) with Affine (IBCAffine), determine that the coding mode used for the coding block is the first affine motion mode and set a value of a merge flag Merge_Flag of the coding block to a first value, and when the reference frame corresponding to the coding block is the original picture and the coding block is coded by IBC with Affine Merge (IBCAffineMerge), determine that the coding mode used for the coding block is the second affine motion mode and set the value of the merge flag Merge_Flag of the coding block to a second value, the first value being different from the second value.

11. The encoder of claim 7, wherein the processor is configured to, when the coding mode is the second affine motion mode, sequentially access the neighbor blocks of the coding block according to a second preset sequence to obtain a second candidate set, the second candidate set comprising at least one neighbor block, and the at least one neighbor block being coded in the first affine motion mode or the second affine motion mode, and create a second candidate list corresponding to the second affine motion mode based on the second candidate set, a second reference block in the second candidate list being obtained from the second candidate set.

12. The encoder of claim 11, wherein the processor is configured to, when the coding mode is the second affine motion mode, traverse the second candidate list to acquire MVPs of at least two control points corresponding to each second reference block in the second candidate list, calculate MVs of control points at corresponding positions of the coding block based on the MVPs of the at least two control points corresponding to each second reference block, and acquire a second coding parameter corresponding to the coding block from the MVs, the second coding parameter representing a group of coding parameters that are obtained in the second affine motion mode for the coding block and have a minimum coding prediction cost; and
   the processor is configured to perform predictive coding on the coding block based on the second coding parameter corresponding to the coding block.

\* \* \* \* \*